United States Patent [19]
Yamamoto et al.

[11] Patent Number: 5,783,273
[45] Date of Patent: Jul. 21, 1998

[54] PTP OR BLISTER PACKAGING ARTICLES AND PACKAGING MATERIAL THEREFOR

[75] Inventors: Yohzoh Yamamoto; Shinji Ohsato; Shiro Honma, all of Kuga-gun, Japan

[73] Assignee: Mitsui Petrochemical Industries, Ltd., Tokyo, Japan

[21] Appl. No.: 59,969

[22] Filed: May 13, 1993

[30] Foreign Application Priority Data

| | | | |
|---|---|---|---|
| May 14, 1992 | [JP] | Japan | 4-121492 |
| Jan. 29, 1993 | [JP] | Japan | 5-013595 |
| Apr. 6, 1993 | [JP] | Japan | 5-079599 |

[51] Int. Cl.$^6$ ............... B32B 15/08; B32B 15/20; B32B 27/08; B32B 27/32
[52] U.S. Cl. ............... 428/35.9; 428/35.8; 428/174; 428/461; 428/515; 428/516; 428/523; 526/281; 53/453
[58] Field of Search ............... 428/516, 500, 428/35.9, 515, 517, 519, 523, 35.3, 35.4, 35.8, 36.6, 36.7, 174, 178, 349, 461; 53/453, 452, 477

[56] References Cited

U.S. PATENT DOCUMENTS

| | | | |
|---|---|---|---|
| Re. 33,832 | 2/1992 | Yoshimura et al. | 525/95 |
| 4,080,491 | 3/1978 | Kobayashi et al. | 526/137 |

(List continued on next page.)

FOREIGN PATENT DOCUMENTS

| | | |
|---|---|---|
| 0 203 799 A1 | 12/1986 | European Pat. Off. . |
| 0384694 | 8/1990 | European Pat. Off. . |

(List continued on next page.)

OTHER PUBLICATIONS

Aldrich Catalog, Aldrich Chemical Company, pp. 1062–1063, 1994.

(List continued on next page.)

*Primary Examiner*—Vivian Chen
*Attorney, Agent, or Firm*—Sherman and Shalloway

[57] ABSTRACT

A press-through packaging or blister package having excellent moisture-proofness, transparency, and superior processibility by vacuum or pneumatic forming, comprising of a formed product having blisters thereon prepared by forming a sheet or film of a non-stretched layer made from one or more non-crystalline polyolefin resins selected from the group consisting of a cycloolefin random copolymer obtained from a non-ring-opening polymerization of ethylene and a cycloolefin having a molecular structure represented by the general formula (1), with an intrinsic viscosity ($\eta$) of 0.01–100 dl/g determined in decalin at 135° C. and a softening temperature (TMA) of 50°–200° C., and a graft-modified product of said cycloolefin random copolymer.

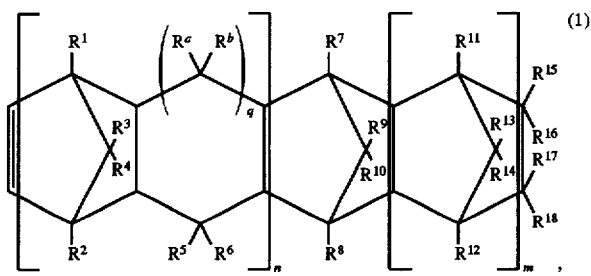

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

25 Claims, 2 Drawing Sheets

U.S. PATENT DOCUMENTS

| | | | |
|---|---|---|---|
| 4,140,731 | 2/1979 | Nakamura et al. | 260/876 R |
| 4,869,938 | 9/1989 | Usami et al. | 428/39.3 |
| 4,973,373 | 11/1990 | Nishida et al. | 156/243 |
| 5,164,469 | 11/1992 | Goto et al. | 526/281 |
| 5,218,049 | 6/1993 | Yamamoto et al. | 525/97 |
| 5,318,824 | 6/1994 | Itaya et al. | 428/178 |

FOREIGN PATENT DOCUMENTS

| | | |
|---|---|---|
| 0 436 372 A2 | 7/1991 | European Pat. Off. . |
| 0518542 | 12/1992 | European Pat. Off. . |
| 61292601 | 12/1986 | Japan . |
| 02-196832 | 9/1990 | Japan . |
| 1398329 | 6/1975 | United Kingdom . |

OTHER PUBLICATIONS

Database WPI Week 9236, Derwent Publ. Ltd., London, GB; AN 92–295405 & JP–A–4 202 218 (Mitsui Petrochemical Industries, Ltd.) 23 Jul. 1992.

Database WPI Week 9320, Derwent Publ. Ltd., London, GB; AN 93–164512 & JP–A 5 097 933 (Idemitsu Kosan Co., Ltd.) 20 Apr. 1993.

PTP OR BLISTER PACKAGING ARTICLES AND PACKAGING MATERIAL THEREFOR

FIELD OF THE INVENTION

The present invention relates to sheet or film materials for PTP (press through pack) or blister packaging, to packages therewith and to a method of packaging therewith.

BACKGROUND OF THE INVENTION

Blister package is employed widely for packaging articles of daily use, household tools, precision instruments and so on. For preparing blister package, a thermoplastic film is first processed by vacuum forming or pneumatic forming so as to form blisters thereon, namely, portions swollen in a predetermined contour corresponding to each specific article to be received therein. After the so-blistered film has been solidified, each blister is charged with each piece of the article to be packed and the film is then covered by a sealing sheet (such as a paper to be used as the support), whereupon the resulting composite containing the articles in the blisters is subjected to a heat sealing or gluing at the "flange" portions surrounding each blister to effect final sealing of the package. In many cases, the blistered film is prepared from a transparent film so as to allow visual inspection of the package contents. For packaging of, in particular, a small-sized article, such as a tablet or a capsule of a drug, PTP has hitherto been employed widely, wherein a fragile or easily torn film, such as an aluminum foil or the like, is used as the sealing sheet so as to permit easy take-out of the packed article by a simple finger-rupture of the sealing sheet.

For the material of sheet or film to be used for the PTP or blister packaging, requirements are placed on a transparency, moistureproofing and processibility by vacuum forming or pneumatic forming and, in particular, an especially higher moistureproof property is required for packaging an unstable tabletted or encapsulated drug.

For such a material of the sheet or film, there have heretofore been employed synthetic polymers, such as, polyvinyl chloride and polypropylene. Since, however, the moistureproof property, namely, the imperviousness to moisture, of these materials is insufficient, it has been practiced to take a measure of improving the moistureproof property of such sheet or film, either by coating it with a layer of polyvinylidene chloride or by preparing the sheet or film under lamination of multilayers. In view of the protection of the environment, alternative materials for such conventional polymer materials are requested and, thus, a partial replacement with polypropylene has become practiced. However, sole employment of polypropylene brings about defects that the resulting product is inferior in the processibility by a vacuum or pneumatic forming with lower productivity and exhibits lower transparency and inferior moistureproof property.

In Japanese Patent Application Kokai No. 292601/1986, there is disclosed a random copolymer based on cycloolefin, formed from ethylene and a cycloolefinic monomer having a molecular structure corresponding to the general formula (1) given below wherein n=0, as an optical material.

However, this copolymer has, in general, a very brittle nature, making it difficult to make a sheet or film with scarce processibility in a vacuum forming and, thus, no suggestion is found therein as to its use for a sheet or film material for PTP or a blister package.

In Japanese Patent Application Kokai No. 196832/1990, there is disclosed a product of sheet or film obtained under biaxial stretching from a cycloolefinic random copolymer of ethylene and a cycloolefin monomer having a molecular structure corresponding to the general formula (1) given below wherein n=o, which copolymer has an intrinsic viscosity of 0.01–10 dl/g determined in decalin at 135° C. and a softening temperature presented by TMA (Thermal Mechanical Analysis) of at least 70° C.

Since, however, the so-obtained sheet or film with biaxial stretching will cause inevitably shrinkage, when the surface thereof has a temperature above the softening point, a processing thereof by a vacuum or pneumatic forming at a temperature above its softening point is difficult.

SUMMARY OF THE INVENTION

An object of the present invention is to provide a sheet or film product for use for PTP or blister package in which the above-mentioned disadvantages are avoided and which is excellent in the moistureproof property and in the transparency with superior processibility by a vacuum or pneumatic forming.

Another object of the present invention is to provide a novel structure of PTP or blister package which is superior in the moistureproof property and capable of preserving the packaged article for a long period of time and exhibits an excellent appearance.

A further object of the present invention is to provide a method for packaging various pieces of articles, by which a PTP or a blister package superior in the moisture-imperviousness and in the transparency can be obtained easily.

The sheet or film for PTP or blister package according to the present invention comprises a layer which is made of a non-crystalline polyolefin resin selected from the group consisting of (A-a) a cycloolefin random copolymer which is made from ethylene and a cycloolefin having a molecular structure represented by the general formula (1) given below, with an intrinsic viscosity [η] of 0.01–10 dl/g determined in decalin at 135° C. and a softening temperature (TMA) of 50°–200° C., (A-b) a (co)polymer, obtained from a ring-opening polymerization of a cycloolefin represented by the general formula (1) given below, or a hydrogenation product thereof, which has an intrinsic viscosity [η] of 0.01–10 dl/g determined in decalin at 135° C. and a softening temperature (TMA) of 50°–200° C. and (A-c) a graft-modification product of said cycloolefin random copolymer (A-a) or said ring-opening (co)polymer or its hydrogenation product (A-b);

or a laminate composed of at least one layer of the above-mentioned non-crystalline polyolefin resin made of the polymer (A-a), (A-b) or (A-c) and, laminated therewith, at least one layer of (B) a crystalline polyolefin resin.

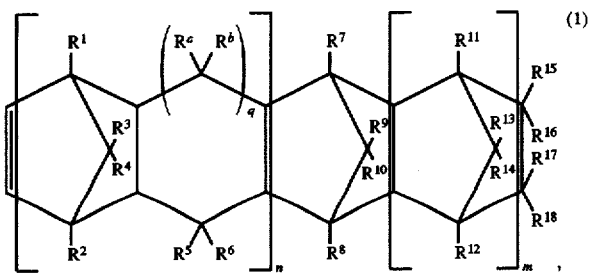

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

The sheet or film according to the present invention is used for preparing a PTP or a blister package. Such a PTP or a blister package is prepared by first forming blisters over the sheet or film for providing for receiving each piece of article to be packed and, after each of the blisters has received the article, sealing each blister by, for example, heat sealing or gluing the "flange" portions of the sheet or film surrounding each blister with a flat sealing member to finish the package.

DETAILED DESCRIPTION OF THE INVENTION

Figure 1:
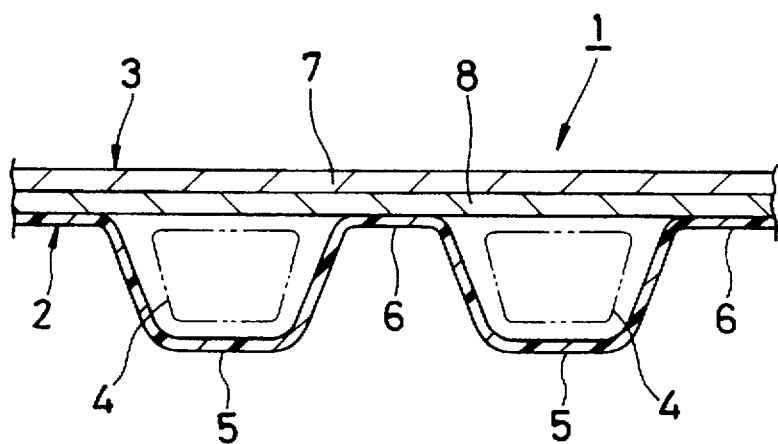
FIGS. 1–4 each show a section of a package according to the present invention with each article being enclosed in the blister.

The sheet or film for PTP or blister package according to the present invention comprises, thus, a monolayer sheet or film made of the non-crystalline polyolefin resin (A) or of a laminated sheet or film composed of at least one layer of the above-mentioned non-crystalline polyolefin resin (A) and at least one further layer of the above-mentioned crystalline polyolefin resin (B).

Now, the explanation shall be directed to the non-crystalline polyolefin resin (A) to be employed as at least a part of the material for the sheet or film according to the present invention.

Non-crystalline Polyolefin Resin (A)

For the non-crystalline polyolefin resin (A) to be employed as the material for at least a part of the sheet or film according to the present invention, there is employed either the above-mentioned cycloolefin random copolymer (A-a), the above-mentioned ring-opening (co)polymer or its hydrogenation product (A-b) based on a cycloolefin, which is expressed hereinafter as "the cycloolefin ring-opening (co)polymer", or a graft-modified product (A-c) of these polymer products (A-a) and (A-b). These polymers are further described in detail below.

The cycloolefin component to be employed for the above-mentioned non-crystalline polyolefin resin comprising either one of the above-mentioned polymer products (A-a) to (A-c) is at least one cycloolefin monomer selected from the group consisting of the above-mentioned unsaturated monomers represented by the general formula (1).

Explaining first the cycloolefin expressed by the above-mentioned general formula (1), $R^1$–$R^{18}$ as well as $R^a$ and $R^b$ of the general formula (1) each represent independently with each other an atom or a radical selected from the group consisting of hydrogen atom, halogen atoms and hydrocarbon groups.

Here, as the halogen atom, fluorine, chlorine, bromine or iodine may be enumerated.

As the hydrocarbon groups, there may be enumerated in general alkyl groups having 1–20 carbon atoms, halogenated alkyl groups having 1–20 carbon atoms, cycloalkyl groups having 3–15 carbon atoms and aromatic hydrocarbon groups. More concretely, the alkyl groups may be, for example, methyl, ethyl, propyl, isopropyl, amyl, hexyl, octyl, decyl, dodecyl and octadecyl. The halogenated alkyl groups may be those in which the hydrogen atoms of the alkyl group are substituted at least partly by fluorine atom, chlorine atom, bromine atom or iodine atom.

The cycloalkyl groups may include, for example, cyclohexyl and the like. The aromatic hydrocarbon groups may include, for example, phenyl, naphthyl and so on.

It is permissible also that a monocyclic ring or a polycyclic ring may be formed by combining each of the pairs consisting of $R^{15}$ with $R^{18}$, $R^{17}$ with $R^{18}$, $R^{15}$ with $R^{17}$, $R^{16}$ with $R^{18}$, $R^{15}$ with $R^{18}$ and $R^{16}$ with $R^{17}$ respectively. Such a monocyclic ring or a polycyclic ring formed in this manner may have one or more double bonds. Concrete examples of such a monocyclic or polycyclic ring thus formed may include the following ring structures:

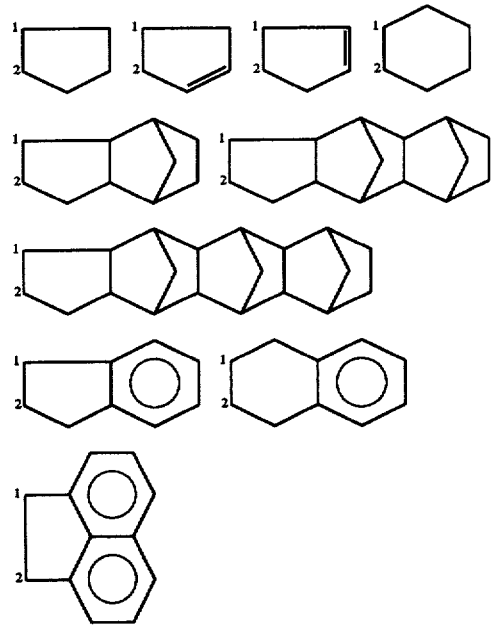

In the above molecular structures, the carbon atom marked with a numeral 1 or 2 indicates that carbon atom to which either $R^{15}(R^{16})$ or $R^{17}$ ($R^{18}$) is combined.

Further, it is also possible that an alkylidene radical may be formed under the combination of either $R^{15}$ with $R^{16}$ or $R^{17}$ with $R^{18}$. Such alkylidene radicals may, in general, have 2–20 carbon atoms and concrete examples therefor include ethylidene, propylidene and isopropylidene.

As preferred ones of the cycloolefin monomer represented by the general formula (1), those expressed by the following general formula (1-1) may be enumerated:

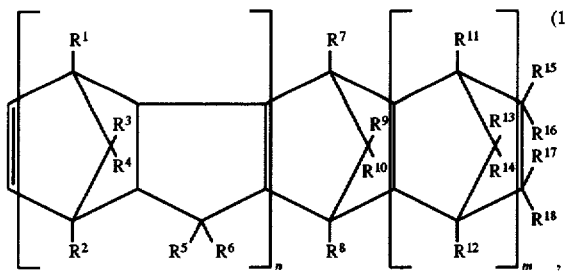

(1-1)

in which n, m and $R^1$-$R^{18}$ have the same meanings as those in the general formula (1).

The following compounds represented by the general formula (2) may further be enumerated as the cycloolefin monomer represented by the general formula (1):

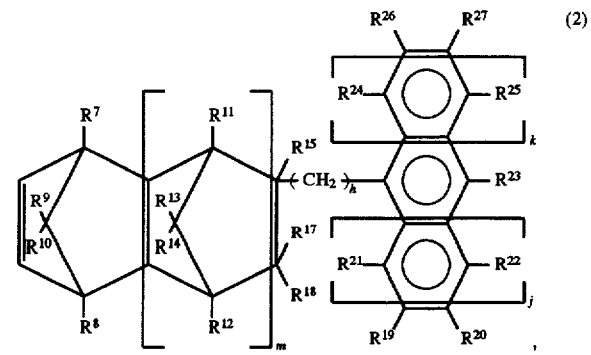

(2)

in which h is zero or a positive, integer, j and k each represent an integer of zero, 1 or 2, m, $R^7$-$R^{15}$ and $R^{17}$-$R^{18}$ have the same meaning as those in the general formula (1) and $R^{19}$-$R^{27}$ each represent independently with each other an atom or a group selected from the group consisting of hydrogen atom, halogen atoms, hydrocarbon groups and alkoxy groups.

The halogen atoms herein are the same as those in the general formula (1).

As the hydrocarbon radicals of $R^{19}$-$R^{27}$ of the general formula (2), there may be enumerated in general, independently with each other, alkyl groups having 1–20 carbon atoms, halogenated alkyl groups having 1–20 carbon atoms, cycloalkyl groups having 3–15 carbon atoms and aromatic hydrocarbon radicals. Concrete examples include, for the alkyl group, methyl, ethyl, propyl, isopropyl, amyl, hexyl, octyl, decyl, dodecyl and octadecyl; and for the halogenated alkyl group, those in which at least a part of hydrogen atoms in the above-exemplified alkyl groups is replaced by fluorine atom, chlorine atom, bromine atom or iodine atom.

For the cycloalkyl group, cyclohexyl and the like are exemplified. The aromatic hydrocarbon radical may include aryl groups, aralkyl groups and so on, concrete examples of which include phenyl, tolyl, naphthyl, benzyl and phenyl ethyl.

For the alkoxy group, there may be enumerated methoxy, ethoxy and propoxy. It is permissible here, that the carbon atom to which $R^{17}$ and $R^{18}$ are combined is bonded directly or under intermediation of an alkylene group having 1–3 carbon atoms to the carbon atom to which $R^{21}$ is combined or to the carbon atom to which $R^{19}$ is combined. Thus, in case the two carbon atoms mentioned above are combined under intermediation of an alkylene group, the radicals represented by $R^{17}$ and $R^{21}$ respectively or the radicals represented by $R^{18}$ and $R^{19}$ respectively will form together an alkylene radical selected among methylene (—$CH_2$—), ethylene (—$CH_2CH_2$—) and trimethylene (—$CH_2CH_2CH_2$—).

In the case of j=k=0 in the general formula (2), the radical pair $R^{23}$ with $R^{20}$ or $R^{23}$ with $R^{27}$ may form a monocyclic or polycyclic aromatic ring by combining with each other. Examples of the monocyclic or polycyclic aromatic ring in case the radical pair $R^{23}$ with $R^{20}$ forms an aromatic ring when j=k=0 include:

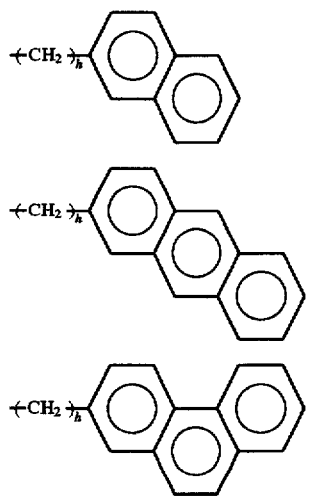

In the above exemplified formulae, the symbol h is the same as that in the general formula (2).

Concrete examples of the cycloolefin monomer represented by the general formulae (1), (1-1) and (2) are:

derivatives of bicyclo[2.2.1]hept-2-ene, derivatives of tetracyclo[$4.4.0.1^{2,5}.1^{7,10}$]-3-dodecene, derivatives of hexacyclo[$6.6.1.1^{3,6}.1^{10,13}.0^{2,7}.0^{9,14}$]-4-heptadecene, derivatives of octacyclo [$8.8.0.1^{2,9}.1^{4,7}.1^{11,18}.1^{13,16}.0^{3,8}.0^{12,17}$]-5-docosene, derivatives of pentacyclo[$6.6.1.1^{3,6}.0^{2,7}.0^{9,14}$]-4-hexadecene, derivatives of heptacyclo-5-eicosene, derivatives of heptacyclo-5-heneicosene, derivatives of tricyclo[$4.3.0.1^{2,5}$]-3-decene, derivatives of tricyclo[$4.4.0.1^{2,5}$]-3-undecene, derivatives of pentacyclo[$6.5.1.1^{3,6}.0^{2,7}.0^{9,13}$]-4-pentadecene, derivatives of pentacyclopentadecadiene, derivatives of pentacyclo[$7.4.0.1^{2,5}.1^{9,12}.0^{8,13}$]-3-pentadecene, derivatives of heptacyclo [$8.7.0.1^{3,6}.1^{10,17}.1^{12,15}.0^{2,7}.0^{11,16}$]-4-eicosene, derivatives of nonacyclo [$10.9.1.1^{4,7}.1^{13,20}.1^{15,18}.0^{3,8}.0^{2,10}.0^{12,21}.0^{14,19}$]-5-pentacosene, derivatives of pentacyclo[$8.4.0.1^{2,5}.1^{9,12}.0^{8,13}$]-3-hexadecene, derivatives of heptacyclo [$8.8.0.1^{4,7}.1^{11,18}.1^{13,16}.0^{3,8}.0^{12,17}$]-5-heneicosene, derivatives of nonacyclo [$10.10.1.1^{5,8}.1^{14,21}.1^{16,19}.0^{2,11}.0^{4,9}.0^{13,22}.0^{15,20}$]-5-hexacosene, derivatives of 1,4-methano-1,4,4a,9a-tetrahydrofluorene, derivatives of 1,4-methano-1,4,4a,5,10,10a-hexahydroanthracene and cyclopentadiene-acenaphthylene adducts.

More concrete examples of the cycloolefins represented by the general formulae (1), (1-1) and (2) are given below:

Derivatives of bicyclo[2.2.1]hept-2-ene, such as

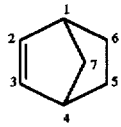

bicyclo[2.2.1]hept-2-ene

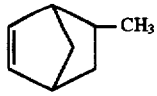

6-methylbycyclo[2.2.1]hept-2-ene

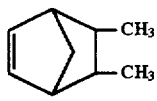

5,6-dimethylbicyclo[2.2.1]-hept-2-ene

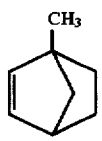

1-methylbicyclo[2.2.1]hept-2-ene

6-ethylbicyclo[2.2.1]hept-2-ene

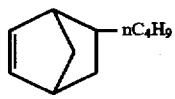

6-n-butylbicyclo[2.2.1]hept-2-ene

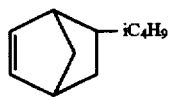

6-isobutylbicyclo[2.2.1]hept-2-ene and

7-methylbicyclo[2.2.1]hept-2-ene;

derivatives of tetracyclo[4.4.0.1$^{2,5}$.1$^{7,10}$]-3-dodecene, such as:

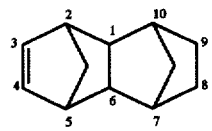

tetracyclo[4.4.0.1$^{2,5}$.1$^{7,10}$]-3-dodecene,

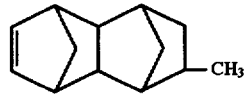

8-methyltetracyclo[4.4.0.1$^{2,5}$.1$^{7,10}$]-3-dodecene,

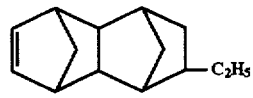

8-ethyltetracyclo[4.4.0.1$^{2,5}$.1$^{7,10}$]-3-dodecene,

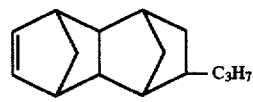

8-propyltetracyclo[4.4.0.1$^{2,5}$.1$^{7,10}$]-3-dodecene,

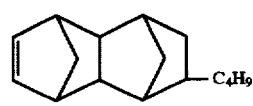

8-butyltetracyclo[4.4.0.1$^{2,5}$.1$^{7,10}$]-3-dodecene,

-continued

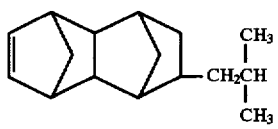 8-isobutyltetracyclo[4.4.0.1$^{2,5}$.1$^{7,10}$]-3-dodecene,

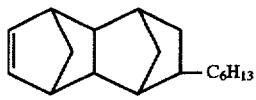 8-hexyltetracyclo[4.4.0.1$^{2,5}$.1$^{7,10}$]-3-dodecene,

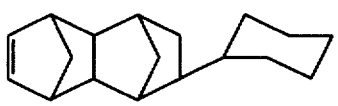 8-cyclohexyltetracyclo[4.4.0.1$^{2,5}$.1$^{7,10}$]-3-dodecene,

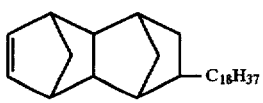 8-stearyltetracyclo[4.4.0.1$^{2,5}$.1$^{7,10}$]-3-dodecene,

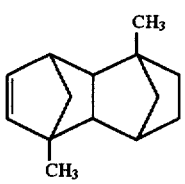 5,10-dimethyltetracyclo[4.4.0.1$^{2,5}$.1$^{7,10}$]-3-dodecene,

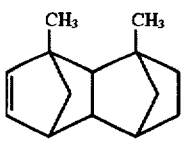 2,10-dimethyltetracyclo[4.4.0.1$^{2,5}$.1$^{7,10}$]-3-dodecene,

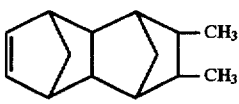 8,9-dimethyltetracyclo[4.4.0.1$^{2,5}$.1$^{7,10}$]-3-dodecene,

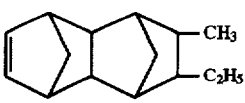 8-ethyl-9-methyltetracyclo[4.4.0.1$^{2,5}$.1$^{7,10}$]-3-dodecene,

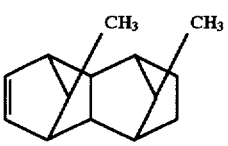 11,12-dimethyltetracyclo[4.4.0.1$^{2,5}$.1$^{7,10}$]-3-dodecene,

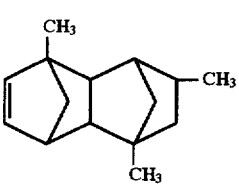 2,7,9-trimethyltetracyclo[4.4.0.1$^{2,5}$.1$^{7,10}$]-3-dodecene,

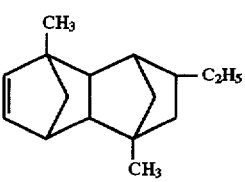 9-ethyl-2,7-dimethyltetracyclo[4.4.0.1$^{2,5}$.1$^{7,10}$]-3-dodecene, -continued

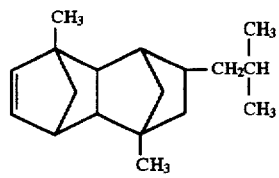
9-isobutyl-2,7-dimethyltetra-
cyclo[4.4.0.1$^{2,5}$.1$^{7,10}$]-3-
dodecene,

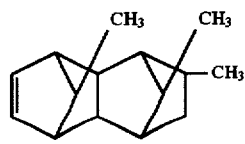
9,11,12-trimethyltetracyclo[4.
4.0.1$^{2,5}$.1$^{7,10}$]-3-dodecene,

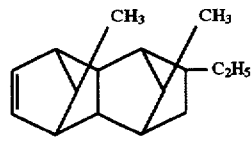
9-ethyl-11,12-dimethyltetra-
cyclo[4.4.0.1$^{2,5}$.1$^{7,10}$]-3-
dodecene,

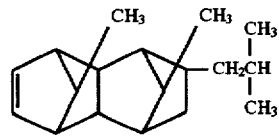
9-isobutyl-11,12-dimethyl-
tetracyclo[4.4.0.1$^{2,5}$.1$^{7,10}$]-
3-dodecene,

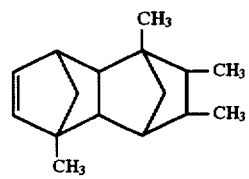
5,8,9,10-tetramethyltetra-
cyclo[4.4.0.1$^{2,5}$.1$^{7,10}$]-3-
dodecene,

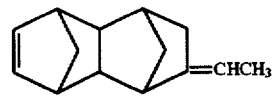
8-ethylidenetetracyclo[4.4.0.
1$^{2,5}$.1$^{7,10}$]-3-dodecene,

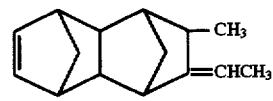
8-ethylidene-9-methyltetra-
cyclo[4.4.0.1$^{2,5}$.1$^{7,10}$]-3-
dodecene,

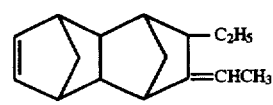
8-ethylidene-9-ethyltetra-
cyclo[4.4.0.1$^{2,5}$.1$^{7,10}$]-3-
dodecene,

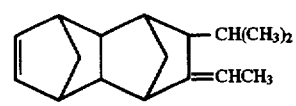
8-ethylidene-9-isopropyltetra-
cyclo[4.4.0.1$^{2,5}$.1$^{7,10}$]-3-
dodecene,

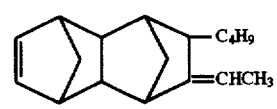
8-ethylidene-9-butyltetra-
cyclo[4.4.0.1$^{2,5}$.1$^{7,10}$]-3-
dodecene,

8-n-propylidenetetracyclo[4.4.
0.1$^{2,5}$.1$^{7,10}$]-3-dodecene,

8-n-propylidene-9-methyltetra-
cyclo[4.4.0.1$^{2,5}$.1$^{7,10}$]-3-
dodecene,

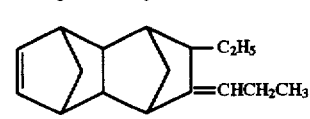
8-n-propylidene-9-ethyltetra-
cyclo[4.4.0.1$^{2,5}$.1$^{7,10}$]-3-
dodecene, -continued

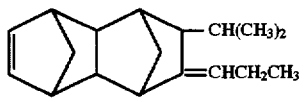 8-n-propylidene-9-isopropyl-tetracyclo[4.4.0.1$^{2,5}$.1$^{7,10}$]-3-dodecene,

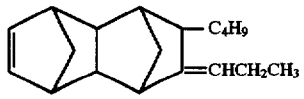 8-n-propylidene-9-butyl-tetracyclo[4.4.0.1$^{2,5}$.1$^{7,10}$]-3-dodecene,

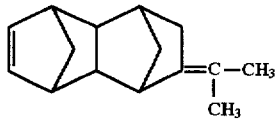 8-isopropylidenetetracyclo[4.4.0.1$^{2,5}$.1$^{7,10}$]-3-dodecene,

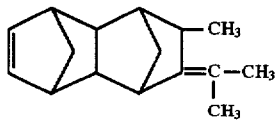 8-isopropylidene-9-methyl-tetracyclo[4.4.0.1$^{2,5}$.1$^{7,10}$]-3-dodecene,

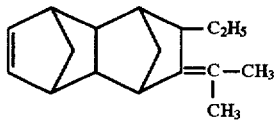 8-isopropylidene-9-ethyl-tetracyclo[4.4.0.1$^{2,5}$.1$^{7,10}$]-3-dodecene,

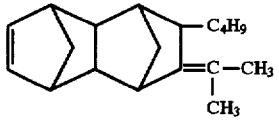 8-isopropylidene-9-isopropyl-tetracyclo[4.4.0.1$^{2,5}$.1$^{7,10}$]-3-dodecene,

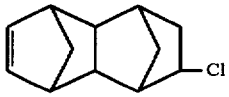 8-isopropylidene-9-butyl-tetracyclo[4.4.0.1$^{2,5}$.1$^{7,10}$]-3-dodecene,

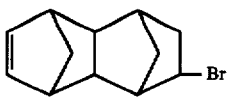 8-chlorotetracyclo[4.4.0.1$^{2,5}$.1$^{7,10}$]-3-dodecene,

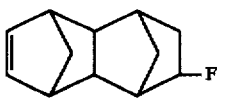 8-bromotetracyclo[4.4.0.1$^{2,5}$.1$^{7,10}$]-3-dodecene,

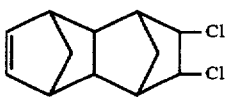 8-fluolotetracyclo[4.4.0.1$^{2,5}$.1$^{7,10}$]-3-dodecene, and 8,9-dichlorotetracyclo[4.4.0.1$^{2,5}$.1$^{7,10}$]-3-dodecene;

derivatives of hexacyclo[6.6.1.1$^{3,6}$.1$^{10,13}$.0$^{2,7}$.0$^{9,14}$]-4-heptadecene, such as:

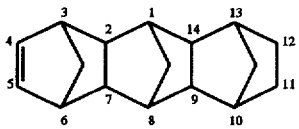 hexacyclo[6.6.1.1$^{3,6}$.1$^{10,13}$.0$^{2,7}$.0$^{9,14}$]-4-heptadecene,

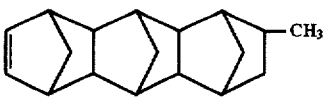 12-methylhexacyclo[6.6.1.1$^{3,6}$.1$^{10,13}$.0$^{2,7}$.0$^{9,14}$]-4-heptadecene, -continued

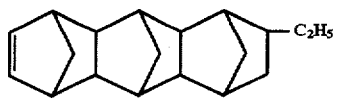
12-ethylhexacyclo[6.6.1.1$^{3,6}$.1$^{10,13}$.0$^{2,7}$.0$^{9,14}$]-4-heptadecene,

12-isobutylhexacyclo[6.6.1.1$^{3,6}$.1$^{10,13}$.0$^{2,7}$.0$^{9,14}$]-4-heptadecene, and

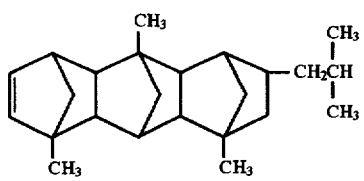
1,6,10-trimethyl-12-isobutyl-hexacyclo[6.6.1.1$^{3,6}$.1$^{10,13}$.0$^{2,7}$.0$^{9,14}$]-4-heptadecene;

derivatives of octacyclo[8.8.0.1$^{2,9}$.1$^{4,7}$.1$^{11,18}$.1$^{13,16}$.0$^{3,8}$.0$^{12,17}$]-5-docosene, such as:

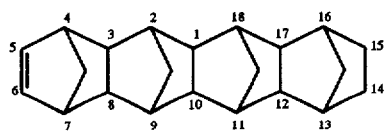
octacyclo[8.8.0.1$^{2,9}$.1$^{4,7}$.1$^{11,18}$.1$^{13,16}$.0$^{3,8}$.0$^{12,17}$]-5-docosene,

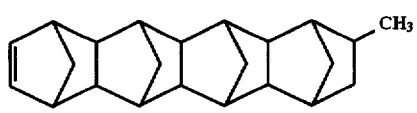
15-methyloctacyclo[8.8.0.1$^{2,9}$.1$^{4,7}$.1$^{11,18}$.1$^{13,16}$.0$^{3,8}$.0$^{12,17}$]-5-docosene and

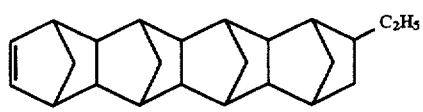
15-ethyl-octacyclo[8.8.0.1$^{2,9}$.1$^{4,7}$.1$^{11,18}$.1$^{13,16}$.0$^{3,8}$.0$^{12,17}$]-5-docosene;

derivative of pentacyclo[6.6.1.1$^{3,6}$.0$^{2,7}$.0$^{9,14}$]-4-hexadecene, such as:

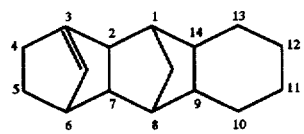
pentacyclo[6.6.1.1$^{3,6}$.0$^{2,7}$.0$^{9,14}$]-4-hexadecene

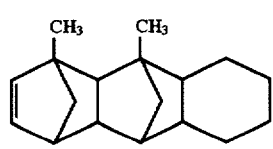
1,3-dimethyl-pentacyclo[6.6.1.1$^{3,6}$.0$^{2,7}$.0$^{9,14}$]-4-hexadecene,

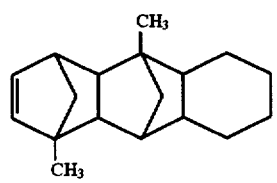
1,6-dimethyl-pentacyclo[6.6.1.1$^{3,6}$.0$^{2,7}$.0$^{9,14}$]-4-hexadecene,

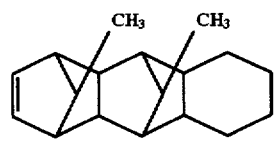
15,16-dimethyl-pentacyclo[6.6.1.1$^{3,6}$.0$^{2,7}$.0$^{9,14}$]-4-hexadecene;

derivatives of heptacyclo-5-eicosene and of heptacyclo-5-heneicosene, such as:

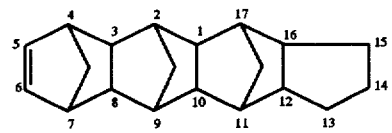
heptacyclo[8.7.0.1$^{2,9}$.1$^{4,7}$.1$^{11,17}$.0$^{3,8}$.0$^{12,16}$]-5-eicosene and -continued

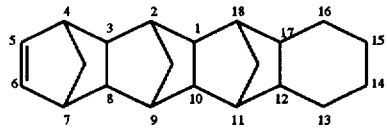
heptacyclo[8.8.0.1$^{2,9}$.1$^{4,7}$.1$^{11,18}$.0$^{3,8}$.0$^{12,17}$]-5-heneicosene;

derivatives of tricyclo[4.3.0.1$^{2,5}$]-3-decene, such as:

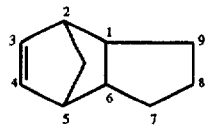
tricyclo[4.3.0.1$^{2,5}$]-3-decene,

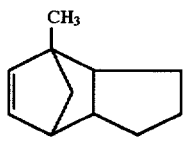
2-methyl-tricyclo[4.3.0.1$^{2,5}$]-3-decene and

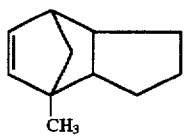
5-methyl-tricyclo[4.3.0.1$^{2,5}$]-3-decene;

derivatives of tricyclo[4.4.0.1$^{2,5}$]-3-undecene, such as:

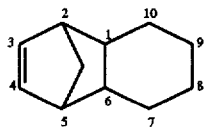
tricyclo[4.4.0.1$^{2,5}$]-3-undecene and

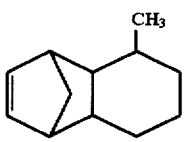
10-methyl-tricyclo[4.4.0.1$^{2,5}$]-3-undecene;

derivatives of pentacyclo[6.5.1.1$^{3,6}$.0$^{2,7}$.0$^{9,13}$]-4-pentadecene, such as:

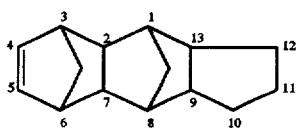
pentacyclo[6.5.1.1$^{3,6}$.0$^{2,7}$.0$^{9,13}$]-4-pentadecene,

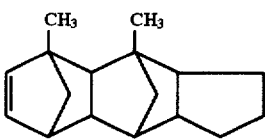
1,3-dimethyl-pentacyclo[6.5.1.1$^{3,6}$.0$^{2,7}$.0$^{9,13}$]-4-pentadecene,

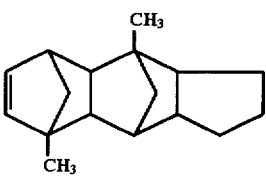
1,6-dimethyl-pentacyclo[6.5.1.1$^{3,6}$.0$^{2,7}$.0$^{9,13}$]-4-pentadecene and

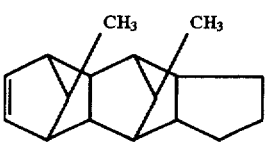
14,15-dimethyl-pentacyclo[6.5.1.1$^{3,6}$.0$^{2,7}$.0$^{9,13}$]-4-pentadecene;

derivatives of diene compounds, such as:

-continued

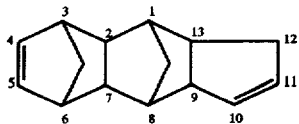
pentacyclo[6.5.1.1³·⁶.0²·⁷.0⁹·¹³]-4,10-pentadecadiene;

derivatives of pentacyclo[7.4.0.1²·⁵.1⁹·¹².0⁸·¹³]-3-pentadecene, such as:

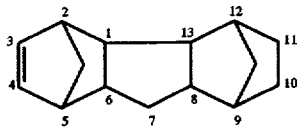
pentacyclo[7.4.0.1²·⁵.1⁹·¹².0⁸·¹³]-3-pentadecene and

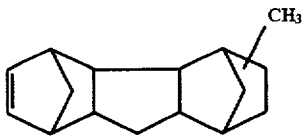
methyl-substituted pentacyclo[7.4.0.1²·⁵.1⁹·¹².0⁸·¹³]-3-pentadecene;

derivatives of heptacyclo[8.7.0.1³·⁶.1¹⁰·¹⁷.1¹²·¹⁵.0²·⁷.0¹¹·¹⁵]-4-eicosene, such as:

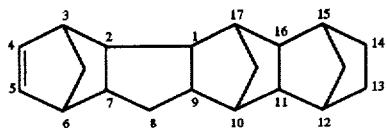
heptacyclo[8.7.0.1³·⁶.1¹⁰·¹⁷.1¹²·¹⁵.0²·⁷.0¹¹·¹⁶]-4-eicosene and

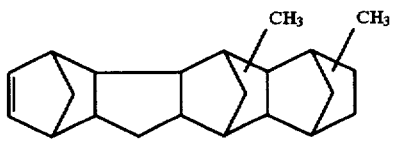
dimethyl-substituted heptacyclo[8.7.0.1³·⁶.1¹⁰·¹⁷.1¹²·¹⁵.0²·⁷.0¹¹·¹⁶]-4-eicosene;

derivatives of nonacyclo[10.9.1.1⁴·⁷.1¹³·²⁰.1¹⁵·¹⁸.0³·⁸.0²·¹⁰.0¹²·²¹.0¹⁴·¹⁹]-5-pentacosene, such as:

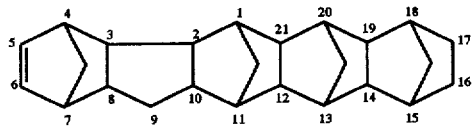
nonacyclo[10.9.1.1⁴·⁷.1¹³·²⁰.1¹⁵·¹⁸.0³·⁸.0²·¹⁰.0¹²·²¹.0¹⁴·¹⁹]-5-pentacosene and

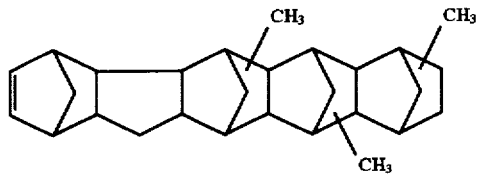
trimethyl-substituted nonacyclo[10.9.1.1⁴·⁷.1¹³·²⁰.1¹⁵·¹⁸.0³·⁸.0²·¹⁰.0¹²·²¹.0¹⁴·¹⁹]-5-pentacosene;

derivatives of pentacyclo[8.4.0.1²·⁵.1⁹·¹².0⁸·¹³]-3-hexadecene, such as:

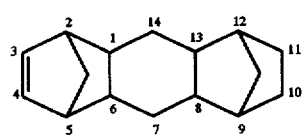
pentacyclo[8.4.0.1²·⁵.1⁹·¹².0⁸·¹³]-3-hexadecene,

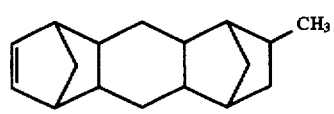
11-methyl-pentacyclo[8.4.0.1²·⁵.1⁹·¹².0⁸·¹³]-3-hexadecene,

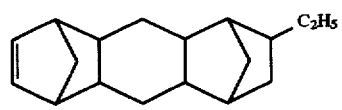
11-ethyl-pentacyclo[8.4.0.1²·⁵.1⁹·¹².0⁸·¹³]-3-hexadecene and

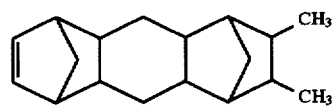
10,11-dimethyl-pentacyclo[8.4.0.1²·⁵.1⁹·¹².0⁸·¹³]-3-hexadecene;

-continued derivatives of heptacyclo[8.8.0.1⁴·⁷.1¹¹·¹⁸.1¹³·¹⁶.0³·⁸.0¹²·¹⁷]-5-heneicosene, such as:

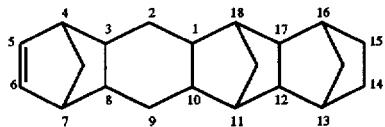

heptacyclo[8.8.0.1⁴·⁷.1¹¹·¹⁸.
1¹³·¹⁶.0³·⁸.0¹²·¹⁷]-5-hen-
eicosene,

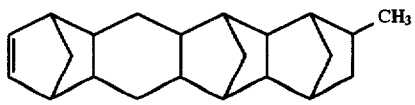

15-methyl-heptacyclo[8.8.0.
1⁴·⁷.1¹¹·¹⁸.1¹³·¹⁶.0³·⁸.
0¹²·¹⁷]-5-heneicosene and

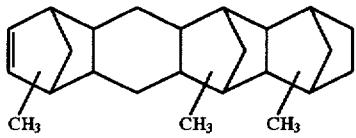

trimethyl-heptacyclo[8.8.0.
1⁴·⁷.1¹¹·¹⁸.1¹³·¹⁶.0³·⁸.
0¹²·¹⁷]-5-heneicosene;

derivatives of nonacyclo[10.10.1.1⁵·⁸.1¹⁴·²¹.1¹⁶·¹⁹.0²·¹¹.0⁴·⁹.0¹³·²².0¹⁵·²⁰]-5-hexacosene, such as:

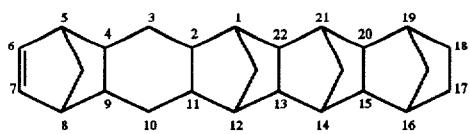

nonacyclo[10.10.1.1⁵·⁸.
1¹⁴·²¹.1¹⁶·¹⁹.0²·¹¹.0⁴·⁹.0¹³·²².0¹⁵·²⁰]-5-hexacosene;

and miscellaneous other compounds, such as:

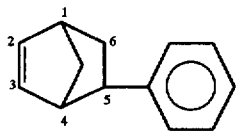

5-phenyl-bicyclo[2.2.1]hept-
2-ene,

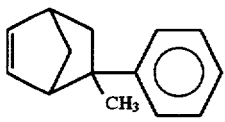

5-methyl-5-phenyl-bicyclo[2.2.
1]hept-2-ene,

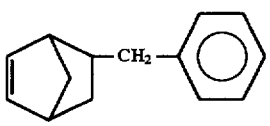

5-benzyl-bicyclo[2.2.1]hept-
2-ene,

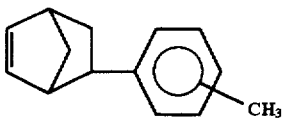

5-tolyl-bicyclo[2.2.1]hept-
2-ene,

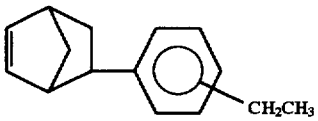

5-(ethylphenyl)-bicyclo[2.2.
1]hept-2-ene,

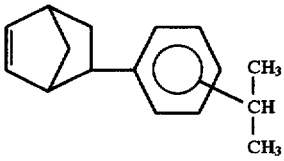

5-(isoproopylphenyl)-bicyclo[2.
2.1]hept-2-ene,

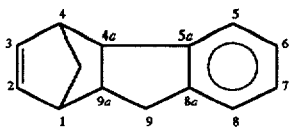

1,4-methano-1,4,4a,9a-tetra-
hydrofluorene,

-continued

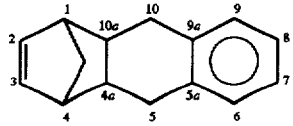
1,4-methano-1,4,4a,5,10,10a-hexahydroanthracene,

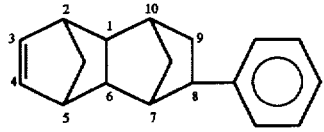
8-phenyl-tetracyclo[4.4.0.1$^{2,5}$.1$^{7,10}$]-3-dodecene,

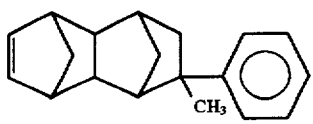
8-methyl-8-phenyl-tetracyclo[4.4.0.1$^{2,5}$.1$^{7,10}$]-3-dodecene,

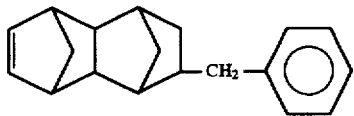
8-benzyl-tetracyclo[4.4.0.1$^{2,5}$.1$^{7,10}$]-3-dodecene,

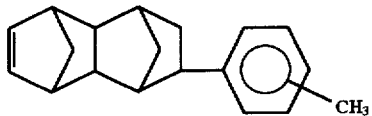
8-tolyl-tetracyclo[4.4.0.1$^{2,5}$.1$^{7,10}$]-3-dodecene,

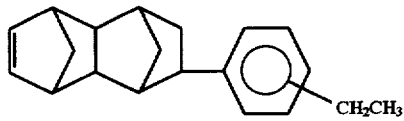
8-(ethylphenyl)-tetracyclo[4.4.0.1$^{2,5}$.1$^{7,10}$]-3-dodecene,

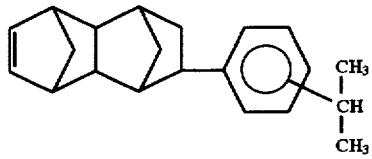
8-(isopropylphenyl)-tetracyclo[4.4.0.1$^{2,5}$.1$^{7,10}$]-3-dodecene,

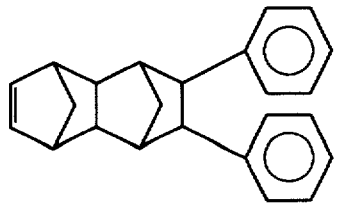
8,9-diphenyl-tetracyclo[4.4.0.1$^{2,5}$.1$^{7,10}$]-3-dodecene,

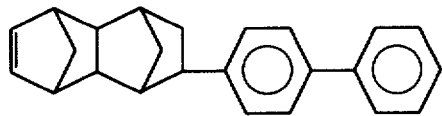
8-(biphenyl)-tetracyclo[4.4.0.1$^{2,5}$.1$^{7,10}$]-3-dodecene,

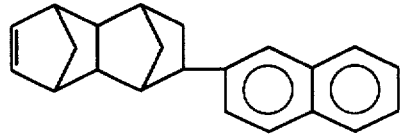
8-(β-naphthyl)-tetracyclo[4.4.0.1$^{2,6}$.1$^{7,10}$]-3-dodecene,

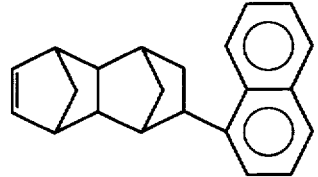
8-(α-naphthyl)-tetracyclo[4.4.0.1$^{2,5}$.1$^{7,10}$]-3-dodecene,

-continued

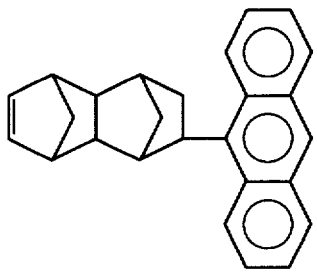
8-(anthracenyl)-tetracyclo[4.4.0.1$^{2,5}$.1$^{7,10}$]-3-dodecene,

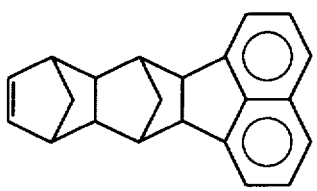
addition product of cyclopentadiene to cyclopentadiene-acenaphthylene adduct,

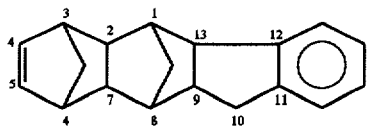
11,12-benzo-pentacyclo[6.5.1.1$^{3,6}$.0$^{2,7}$.0$^{9,13}$]-4-pentadecene,

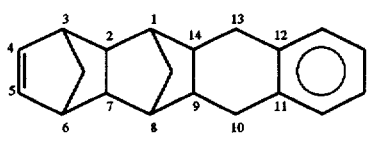
11,12-benzo-pentacyclo[6.6.1.1$^{3,6}$.0$^{2,7}$.0$^{9,14}$]-4-hexadecene,

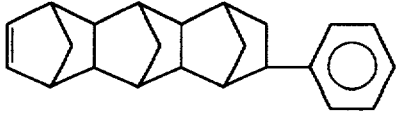
11-phenyl-hexacyclo[6.6.1.1$^{3,6}$.1$^{10,13}$.0$^{2,7}$.0$^{9,14}$]-4-heptadecene,

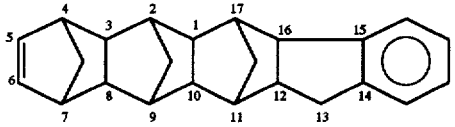
14,15-benzo-heptacyclo[8.7.0.1$^{2,9}$.1$^{4,7}$1$^{11,17}$.0$^{3,8}$0$^{12,16}$]-5-eicosene,

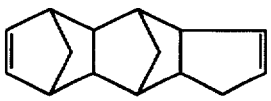
pentacyclo[6.5.1.1$^{3,6}$.0$^{2,7}$.0$^{9,13}$]-4,11-pentadecadiene,

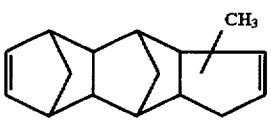
methyl-substituted pentacyclo[6.5.1.1$^{3,6}$.0$^{2,7}$.0$^{9,13}$]-4,11-pentadecadiene,

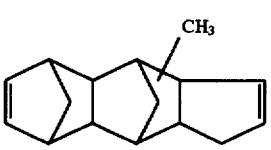
methyl-substituted pentacyclo[6.5.1.1$^{3,6}$.0$^{2,7}$.0$^{9,13}$]-4,11-pentadecadiene,

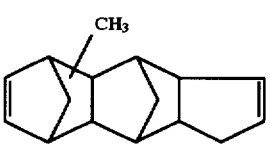
methyl-substituted pentacyclo[6.5.1.1$^{3,6}$.0$^{2,7}$.0$^{9,13}$]-4,11-pentadecadiene,

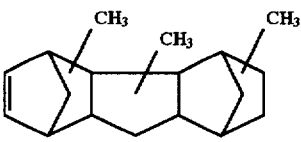
trimethyl-substituted pentacyclo[4.7.0.1$^{2,5}$.0$^{8,13}$.1$^{9,12}$]-3-pentadecene, -continued

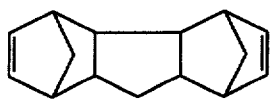
pentacyclo[4.7.0.1$^{2.5}$.0$^{8.13}$.1$^{9.12}$]-3,10-pentadecadiene,

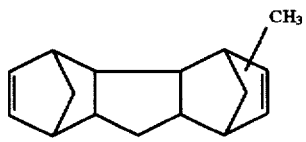
methyl-substituted pentacyclo[4.7.0.1$^{2.5}$.0$^{8.13}$.1$^{9.12}$]-3,10-pentadecadiene,

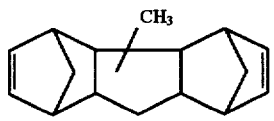
methyl-substituted pentacyclo[4.7.0.1$^{2.5}$.0$^{8.13}$.1$^{9.12}$]-3,10-pentadecadiene,

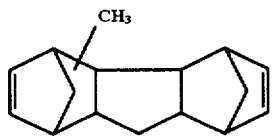
methyl-substituted pentacyclo[4.7.0.1$^{2.5}$.0$^{8.13}$.1$^{9.12}$]-3,10-pentadecadiene,

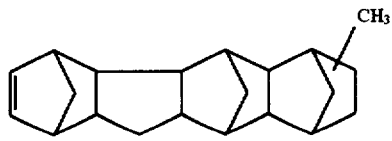
methyl-substituted heptacyclo[7.8.0.1$^{3.6}$.0$^{2.7}$.1$^{10.17}$.0$^{11.16}$.1$^{12.15}$]-4-eicosene,

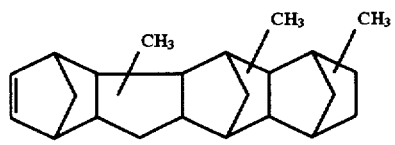
trimethyl-substituted heptacyclo[7.8.0.1$^{3.6}$.0$^{2.7}$.1$^{10.17}$.0$^{11.16}$.1$^{12.15}$]-4-eicosene,

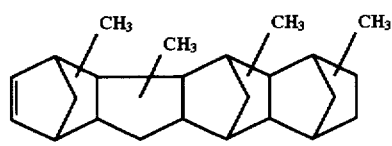
tetramethyl-substituted heptacyclo[7.8.0.1$^{3.6}$.0$^{2.7}$.1$^{10.17}$.0$^{11.16}$.1$^{12.15}$]-4-eicosene,

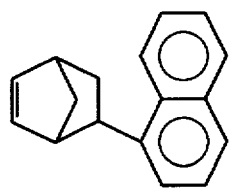
5-(α-naphthyl)bicyclo[2.2.1]hept-2-ene

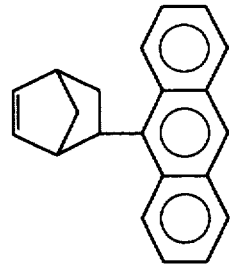
5-(anthracenyl)bicyclo[2.2.1]hept-2-ene

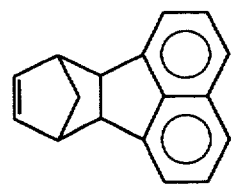
cyclopentadiene-acenaphthylene adduct,

The cycloolefins represented by the general formula (1), and (1-1) and (2) to be employed according to the present invention can be produced by subjecting cyclopentadiene and an olefinic compound of corresponding molecular structure to Diels-Alder reaction.

Cycloolefin Random Copolymer (A-a)

The cycloolefin random copolymer (A-a) comprises the cycloolefin component mentioned above and ethylene component as the essential constituents, while other subsidiary copolymerizable unsaturated monomer component(s) than the above two essential components may be included on requirement within a range not obstructing the purpose of the present invention.

For the subsidiary unsaturated monomer which may be copolymerized in a voluntary manner, there may be enumerated, for example, α-olefins having 3–20 carbon atoms, hydrocarbon-based monomers having at least two carbon-carbon double bonds in the molecule and cycloolefins other than those represented by the general formula (1).

Concrete examples of the α-olefins having 3–20 carbon atoms including propylene, 1-butene, 1-penetene, 4-methyl-1-pentene, 3-methyl-1-pentene, 1-hexene, 1-heptane, 1-octane, 1-nonene, 1-decene, 1-dodecene, 1-tetradecene, 1-hexadecene, 1-octadecene and 1-eicosene.

Concrete examples of the hydro-carbon based monomer having at least two C=C double bonds in the molecule include aliphatic non-conjugated dienes, such as, 1,4-hexadiene, 1,6-octadiene, 2-methyl-1,5-hexadiene, 4-methyl-1,5-hexadiene, 5-methyl-1,5-hexadiene, 6-methyl-1,5-heptadiene and 7-methyl-1,6-octadiene; cyclic non-conjugated dienes, such as, cyclohexadiene, dicyclopentadiene, methyltetrahydroindene, 2-norbornene, 5-vinyl-2-norbornene, 5-ethyilidene-2-norbornene, 5-methylene-2-norbornene, 5-isopropylidene-2-norbornene, 6-chloromethyl-5-isopropenyl-2-norbornene and 4,9,5,8-dimethano-3a,4,4a,5,8,8a,9,9a-octahydro-1H-benzoindene; 2,3-diisopropylidene-5-norbornene; 2-ethylidene-3-isopropylidene-5-norbornene; and 2-propenyl-2,2-norbornadiene.

Among these, 1,4-hexadiene, 1,6-octadiene and cyclic non-conjugated dienes, in particular, dicyclopentadiene, 5-ethyilidene-2-norbornene, 5-vinyl-2-norbornene, 5-methylene-2-norbornene, 1,4-hexadiene and 1,6-octadiene are preferred.

Concrete examples of the cycloolefin other than the cycloolefin monomers represented by the general formula (1) include cyclobutene, cyclopentene, cyclohexene, 3,4-dimethylcyclohexene, 3-methylcyclohexene, 2-(2-methylbutyl)-1-cyclohexene, 2,3,3a,7a-tetrahydro-4,7-methano-1H-indene and 3a,5,6,7a-tetrahydro-4,7-methano-1H-indene.

Such subsidiary unsaturated monomers which may be copolymerized in a voluntary manner can be employed solely or in combination, usually in an amount not exceeding 50 mole %, based on the total moles of the randomly copolymerized comonomers in the copolymer (A-a).

In the cycloolefin random copolymer (A-a), the amount of the structural units derived from ethylene may be adequately within the range of 40–85 mole %, preferably 50–75 mole %, and the amount of the structural units derived from the cycloolefin monomer may be pertinently within the range of 15–60 mole %, preferably 20–50 mole %, based on the total comonomer units in the copolymer, in which the monomer units derived from ethylene and the monomer units derived from the cycloolefin monomer in the copolymer constitute a substantially linear polymer chain under random distribution thereof in the polymer chain. The assumption that the cycloolefin random copolymer (A-a) is present as a substantially linear chain and does not exhibit a cross-linked gelled molecular structure can be ascertained by the fact that this copolymer dissolves completely in decalin at 135° C.

The cycloolefin random copolymer (A-a) according to the present invention has an intrinsic viscosity [η], determined in decalin at 135° C., in the range of 0.01–10 dl/g, preferably 0.05–5 dl/g, and a softening temperature (TMA), determined on a Thermal Mechanical Analyzer, in the range of 50°–200° C., preferably 60°–200° C. and most preferably 70°–150° C. Here, the softening temperature (TMA) is determined in the needle-penetration method, in which a quartz needle having a diameter of 1.0 mm is placed vertically on the sheet to be tested under a load of 49 g, while the sheet is heated at a temperature elevation rate of 5° C. per minute, wherein the temperature at which the needle has penetrated into the sheet to a depth of 0.635 mm is determined as the softening temperature.

As the cycloolefin random copolymer (A-a) according to the present invention, those having an iodine value (grams of iodine per 100 grams of the copolymer) of 30 or less, preferably 25 or less, a glass transition temperature Tg of, in general, 30°–180° C., preferably 40°–180° C., and a crystallinity, determined by X-ray diffraction method, of 0–10%, preferably 0–7%, most preferably 0–5%, are preferred.

In the cycloolefin random copolymers (A-a) according to the present invention, at least a part of the structural unit derived from the cycloolefin monomer of the formula (1), (1-1) or (2) is represented by the following structural formulae (1-a), (1-1-a) or (2-a) respectively:

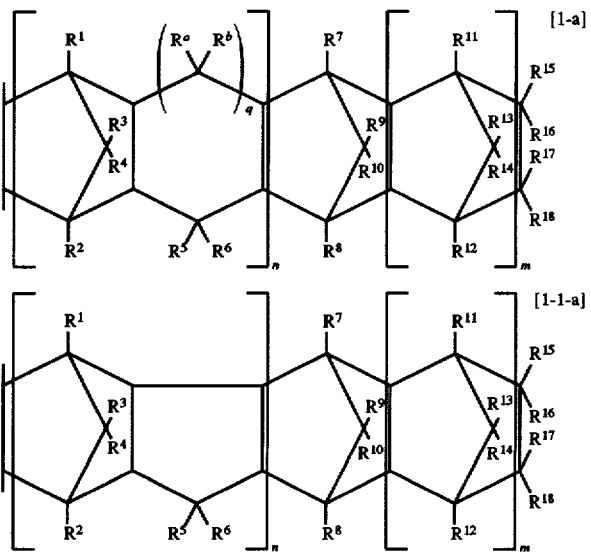

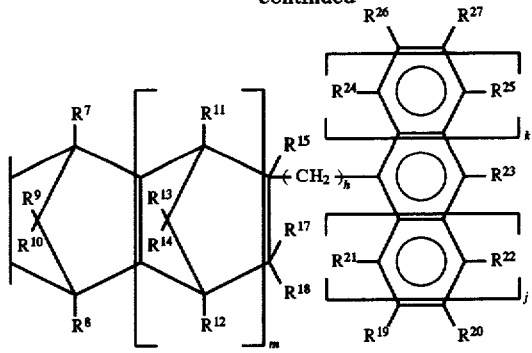

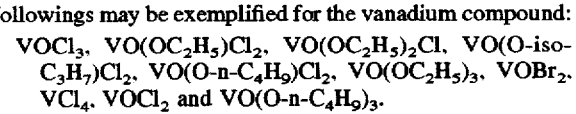
[2-a]

in which n, m, q, $R^1$-$R^{18}$ and $R^a$ and $R^b$ in the general formulae (1-a) and (1-1-a) have the same meanings as those in the general formula (1) and m, h, j, k, $R^7$-$R^{15}$ and $R^{17}$-$R^{27}$ in the general formula (2-a) have the same meanings as those in the general formula (2).

According to the present invention, it is permissible to employ the cycloolefin random copolymer (A-a) either solely or in a combined form as a non-crystalline polyolefin resin mixture (denoted in the following occasionally as "the resin mixture A") together with a further cycloolefin random copolymer (A-d) having an intrinsic viscosity [η] determined in decalin at 135° C. of 0.01–5 dl/g, preferably 0.02–3 dl/g, and a softening temperature (TMA) of lower than 50° C., preferably in the range from −10° C. to below +50° C., most preferably in the range from +10° C. to below +50° C.

For the further cycloolefin random copolymer (A-d), those which have a glass transition temperature Tg of, in general, −30–+60° C., preferably −20–+50° C., and a crystallinity, determined by the X-ray diffraction method, of 0–10%, preferably 0–7%, most preferably 0–5%, in addition to the above-mentioned physical parameters, are preferred.

For the copolymer (A-d), those having a structural formula of (A-a) but exhibiting parameters different from those prescribed according to the present invention, such as, the intrinsic viscosity [η] and softening temperature (TMA), can also be employed. For example, those resulting from a copolymerization of ethylene with a comonomer other than that represented by the general formula (1) and those resulting from a modification treatment of the copolymer (A-a) can be employed.

The mixing ratio of the copolymer (A-d) to the copolymer (A-a) may be 0.1–10 parts by weight, preferably 0.3–7 parts by weight, more preferably 0.5–5 parts by weight, most preferably 1.2 parts by weight of the copolymer (A-d) per 100 parts by weight of the copolymer (A-a).

The cycloolefin random copolymer (A-a) according to the present invention can be produced by copolymerizing ethylene with the cycloolefin component represented by the general formula (1), optionally together with the copolymerizable further monomer component, in the presence of a well-known Ziegler catalyst.

As the Ziegler catalyst, for example, (I) those which are constituted of an organoaluminum compound and a composite product containing at least magnesium, titanium and a halogen, (II) those which are constituted of an organoaluminum compound and a vanadium compound and (III) those which are constituted of a zirconium compound and an aluminoxane may be enumerated.

Now, the description is directed to the concrete procedures for the production of the cycloolefin random copolymer (A-a) under the use of a catalyst composed of a soluble vanadium compound and an organoaluminum compound.

The soluble vanadium compound to be used as a component of the Ziegler catalyst in the production of the cycloolefin random copolymer (A-a) is a compound soluble in the hydrocarbon medium of the reaction system of the copolymerization and is represented by the general formula $$VO(OR)_aX_b$$

or $$V(OR)_cX_d$$

in which R represents a hydrocarbon radical, X is a halogen atom and the symbols a, b, c and d subject to the condition $0 \leq a \leq 3$, $0 \leq b \leq 3$, $2 \leq a+b \leq 3$, $0 \leq c \leq 4$ $0 \leq d \leq 4$ and $3 \leq c+d \leq 4$ and electron donating adducts thereof. More concretely, the followings may be exemplified for the vanadium compound:

$VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_2$, $VCl_4$, $VOCl_2$ and $VO(O\text{-n-}C_4H_9)_3$.

For the organoaluminum compound, there may be employed a compound having at least one aluminum-carbon bond in the molecule, for example, an aluminum compound represented by the general formula (i), $$R^1{}_m Al(OR^2)_n H_p X_q \tag{i}$$

in which $R^1$ and $R^2$ denote each, independently with each other, a hydrocarbon radical, which may be identical with or different from each other, X denotes a halogen atom and m, n, p and q represent each a number subject to the condition $0 \leq m \leq 3$, $0 \leq n < 3$, $0 \leq p < 3$, $0 \leq q < 3$ and m+n+p+q=3, or an alkylated complex compound of aluminum with a metal of group 1 of the periodic table represented by the general formula (ii)

$$M^1 Al(R^1)_4 \tag{ii}$$

in which $M^1$ denotes an alkali metal Li, Na or K and $R^1$ has the same meaning as that in the formula (i).

Examples of the organoaluminum compound expressed by the general formula (i) include compounds which are represented by the general formula $$R^1{}_m Al(OR^2)_{3-m}$$

{in which $R^1$ and $R^2$ are the same as those of formula (i) and m is a number of, preferably, $1.5 \leq m \leq 3$}, by the general formula $$R^1{}_m AlX_{3-m}$$

{in which $R^1$ is the same as that of formula (i), X denotes a halogen atom and m is a number of, preferably 0<m<3}, by the general formula $$R^1{}_m AlH_{3-m}$$

{which $R^1$ is the same as that of formula (i) and m is a number of, preferably $2 \leq m<3$} and by the general formula $$R^1{}_m Al(OR^2)_n X_q$$

{in which $R^1$ and $R^2$ are the same as those of formula (i), X stands for a halogen atom and m, n and q each are a number subject to the condition 0<m≦3, 0≦n<3, 0≦q<3 and m+n+q=3}.

As a compound similar to that of the general formula (i), an organoaluminum compound in which two or more aluminum atoms are bound together through an oxygen atom or nitrogen atom can also be employed. Examples of such compounds include $(C_2H_5)_2AlOAl(C_2H_5)_2$, $(C_4H_9)_2AlOAl(C_4H_9)_2$, $(C_2H_5)_2AlN(C_6H_5)Al(C_2H_5)_2$ and the like.

Concrete examples of the compounds that belong to the general formula (ii) include $LiAl(C_2H_5)_4$ and $LiAl(C_7H_{15})_4$.

The copolymerization is carried out usually in a hydrocarbon medium. For the hydrocarbon medium, aliphatic hydrocarbons, such as, hexane, heptane, octane and kerosene; cycloaliphatic hydrocarbons, such as, cyclohexane and methylcyclohexane; and aromatic hydrocarbons, such as, benzene, toluene and xylene; as well as the copolymerizable unsaturated monomer itself may be employed either solely or as a mixture of two or more of them.

The copolymerization may preferably be carried out in a continuous process in which the concentration of the soluble vanadium compound to be supplied to the copolymerization reaction system may be below 10 times, preferably 7-1 time, more preferably, 5-1 time, most preferably 3-1 time of the concentration value for the soluble vanadium compound in the copolymerization reaction system. The atom ratio of aluminum to vanadium (Al/V) in the copolymerization reaction system may be two or more, preferably 2-50, more preferably 3-20. The soluble vanadium compound and the organic aluminum compound are supplied to the copolymerization reaction system each usually under dilution with the above-mentioned hydrocarbon medium. Here, it is desirable to dilute the soluble vanadium compound to a concentration within the above-mentioned concentration range, while the organoaluminum compound may be supplied to the system after its concentration has been adjusted to a desired value of, for example, 50 times or less of the concentration value thereof in the reaction (copolymerization) system. The concentration of the soluble vanadium compound in the reaction system may, in general, be 0.01–5 gram-atoms per liter, preferably 0.05–3 gram-atoms per liter.

According to the present invention, it is permissible to carry out the copolymerization in the presence of, if necessary, an electron doner, in addition to the two catalyst components, namely, the above-mentioned soluble vanadium compound and the organoaluminum compound. As the electron doner, there may be employed oxygen-containing electron donating compounds, such as, alcohols, phenols, ketones, aldehydes, carboxylic acids, esters of organic or inorganic acids, ethers, acid amides, acid anhydrides and alkoxysilanes, and nitrogen-containing electron donating compounds, such as, ammonia, amines, nitrils and isocyanates.

The copolymerization may realized at a temperature of $-50°$–$+100°$ C., preferably $-30°$–$+80°$ C., more preferably $-20°$–$+60°$ C. The copolymerization is carried out usually in a continuous process, wherein the copolymerizable components, namely, ethylene, the cycloolefin monomer and, optionally, a further polymerizable component are supplied to the copolymerization reaction system together with the catalyst components, i.e. the soluble vanadium compound and the organoaluminum compound, as well as the hydrocarbon polymerization medium, while extracting the copolymerization product mixture continuously from the reaction system. The average residence time during the copolymerization depends on the each specific copolymerizable component employed, the concentration of the catalyst components and the reaction temperature, though it may usually be in the range of from 5 minutes to 5 hours, preferably from 10 minutes to 3 hours. The pressure during the copolymerization may usually be maintained at a value from the atmospheric pressure to 50 Kg/cm² G or lower, preferably from the atmospheric pressure to 20 Kg/cm² G or lower, wherein it is permissible that an inert gas, such as nitrogen or argon, is allowed to co-exist. It is also permissible to employ a polymerization regulator, such as hydrogen, in an adequate manner, in order to adjust the molecular weight of the resulting copolymer.

The mole ratio of ethylene/cycloolefin supplied to the copolymerization reaction system may usually be in the range of from 99/1 to 1/99, preferably from 98/2 to 2/98.

The reaction product of the copolymerization is a solution of the cycloolefin random copolymer in the hydrocarbon medium. Usually, the concentration of the cycloolefin random copolymer in this reaction solution is 2–20% by weight, preferably 2–10% by weight. By contacting this liquid reaction product with a ketone, such as, acetone, methyl ethyl ketone or acetylacetone, or with an alcohol, such as, methanol, ethanol or butanol with agitation at a temperature of, usually, 0°–100° C., preferably 10°–70° C., more preferably at a temperature near the boiling point of the ketone or alcohol employed, the cycloolefin random copolymer (A-a) is precipitated.

The cycloolefin random copolymer (A-a) is then separated by an adequate separation means, such as filtration or centrifugation from the liquid mixture.

The polymerization may also be carried out using a catalyst system composed of a zirconium compound and an aluminoxane compound. One concrete example of such a catalyst system is composed of (a) a zirconium compound having as the ligand at least two indenyl or substituted indenyl groups or partially hydrogenated groups thereof being bonded via an alkylene group such as ethylene group, and (b) an aluminoxane.

The zirconium compound may have at least two indenyl or substituted indenyl groups or partially hydrogenated groups thereof, preferably two indenyl groups, two substituted indenyl groups, or two partially hydrogenated groups thereof.

Specific examples of the above zirconium compound include ethylenebis(indenyl)zirconium dichloride, ethylenebis(indenyl)zirconium monochloride monohydride, ethylenebis(indenyl)ethoxyzirconium chloride, ethylenebis(4,5,6,7-tetrahydro-1-indenyl)ethoxyzirconium chloride, ethylenebis(indenyl)dimethylzirconium, ethylenebis(4,5,6,7-tetrahydro-1-indenyl)dimethylzirconium, ethylenebis(4-methyl-1-indenyl)zirconium dichloride and propylenebis(4,5,6,7-tetrahydro-1-indenyl)zirconium dichloride.

The aluminoxane used as component (b) of the catalyst may be, for example, an organoaluminum compound represented by the following general formula

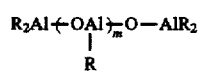

or

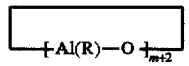

wherein R represents a hydrocarbon group such as a methyl, ethyl, n-propyl, isopropyl, n-butyl or isobutyl group, preferably the methyl, ethyl or isobutyl group, more preferably the methyl group, m is an integer of 2 or more, preferably 5 or more.

Using this catalyst system, the temperature in the polymerization reaction in the process of this invention is usually $-50°$ C. to $230°$ C., preferably $-30°$ C. to $200°$ C.

The proportion of the zirconium compound used in carrying out the process of this invention in the liquid phase is usually $10^{-8}$ to $10^{-2}$ gram-atom/l, preferably $10^{-7}$ to $10^{-3}$ gram-atom/l, as the concentration of the zirconium atom in the polymerization reaction system. The proportion of the aluminoxane is usually $10^{-4}$ to $10^{-1}$ gram-atom/l, preferably $10^{-3}$ to $5\times10^{-2}$ gram-atom/l, as the concentration of the aluminum atom in the polymerization reaction system. The ratio of the aluminum atom to the transition metal atom in the polymerization system is usually from 4 to $10^7$, preferably from 10 to $10^6$. The molecular weight of the copolymer can be adjusted by using hydrogen, and/or adjusting the polymerization temperature.

The cycloolefin random copolymer (A-d) can also be produced in a similar manner as in the production of the cycloolefin random copolymer (A-a).

Concrete procedures of the production of the cycloolefin random copolymer (A-a) are disclosed in various literatures, for example, Japanese Patent Application Kokai Nos. 168708/1985, 95905/1985, 95906/1985, 120816/1986, 115912/1986, 115916/1986, 271308/1986, 272216/1986, 252406/1987 and 252407/1987.

The Cycloolefin Ring-Opening (co)Polymer (A-b)

It is permissible according to the present invention to employ, instead of the above cycloolefin random copolymer (A-a), a polymer or a copolymer from a ring-opening polymerization of cycloolefin(s) or the hydrogenation product thereof.

For the cycloolefinic monomer which constitutes the cycloolefin ring-opening (co)polyer (A-b), there may be employed at least one cycloolefin selected from the group consisting of the unsaturated monomers represented by the general formula (1).

Examples of such cycloolefin ring-opening (co)polymers (A-b) are disclosed, for example, in Japanese Patent Application Kokai No. 26024/1985.

The cycloolefin ring-opening (co)polymer (A-b) to be employed according to the present invention is composed of at least one of the structural units derived from the cycloolefin monomers represented by the general formulea (1), (1-1) and (2), in which at least a part of these structural units consists of the unit which is expressed by one of the following formulae (1-b), (1-1-b) and (2-b):

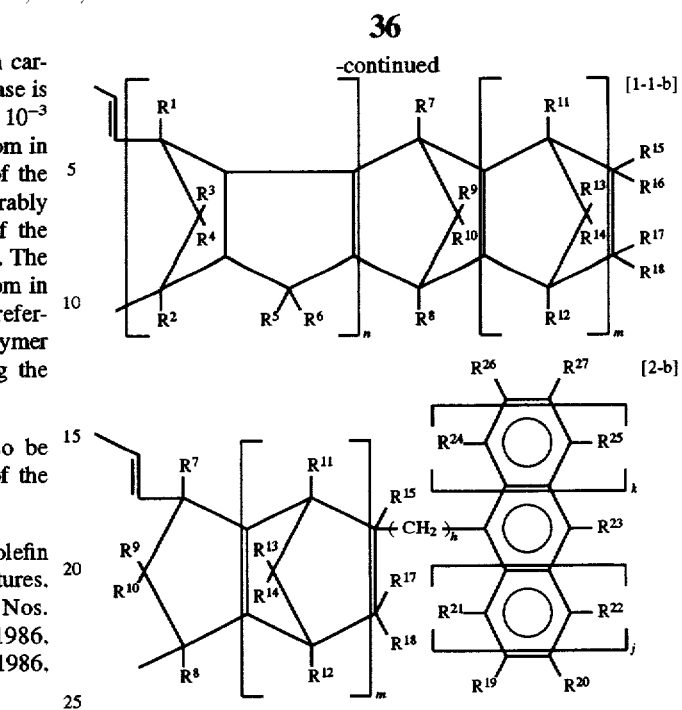

In the above formulae (1-b) and (1-1-b), the symbols n, m, q, $R^1$–$R^{18}$ and $R^a$ and $R^b$ have the same meanings as those in the general formula (1) and the symbols m, h, 7, k, $R^7$–$R^{15}$ and $R^{17}$–$R^{27}$ in the formula (2-b) have the same meaning as those of the general formula (2).

The hydrogenation product of the ring-opening (co) polymer (A-b) to be employed according to the present invention is obtained by hydrogenating the above-mentioned ring-opening (copolymer in the presence of a known hydrogenation catalyst.

In the hydrogenation product of the ring-opening (co) polymer (A-b), at least one of the structural unit derived from the cycloolefinic monomers of the general formulae (1), (1-1) and (2) has either one of the structures represented by the following formulae (1-c), (1-1-c) and (2-c).

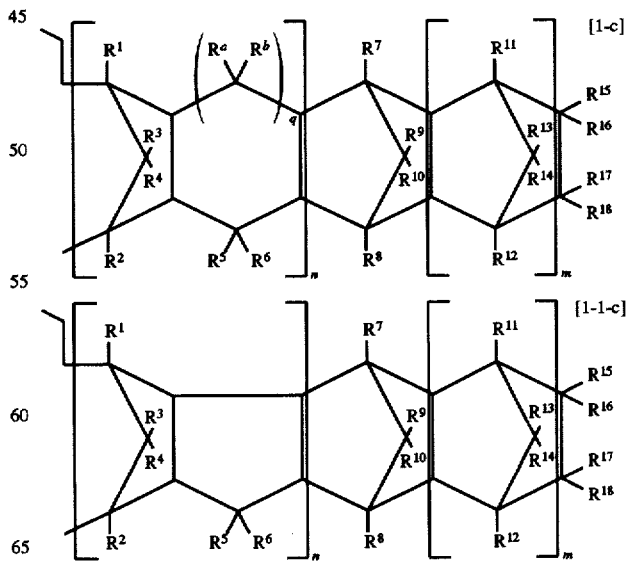

-continued

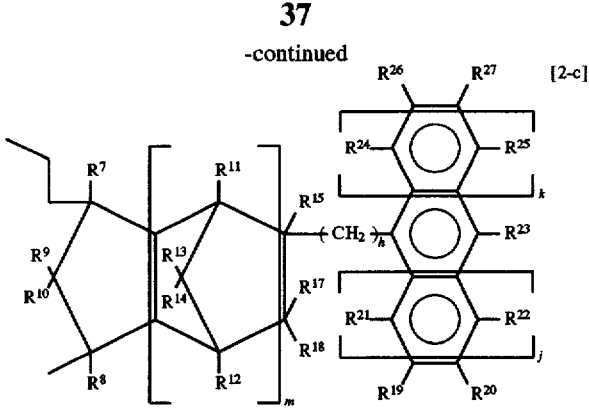

[2-c]

The symbols n, m, q, $R^1$-$R^{18}$ and $R^a$ and $R^b$ in the above formulae (1-c) and (1-1-c) have the same meanings as those of the general formula (1) and the symbols m, h, j, k, $R^7$-$R^{15}$ and $R^{17}$-$R^{27}$ in the above formula (2-c) have the same meanings as those of the general formula (2).

The cycloolefin ring-opening (co)polymer (A-b) should contain at least one of the above-mentioned cycloolfin monomers as the essential component, while it is permissible that copolymerizable unsaturated further monomer component(s) may, if necessary, be incorporated in an amount within a range not obstructing the purpose of the invention. As the copolymerizable unsaturated further monomer, there may be enumerated, for example, cycloolefinic compounds represented by the following general formula (3):

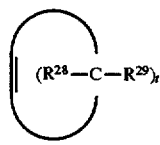

[3]

in which $R^{28}$ and $R^{29}$ represent each a hydrogen atom, a hydrocarbon group or a halogen atom, which may be identical with or different from each other, and t is an integer of 2 or higher and may be different for the cases where $R^{28}$ and $R^{29}$ are present several times repeatingly.

Concrete examples of the monomer components represented by the general formula (3) include cyclobutene, cyclopentene, cyclohexene, cycloheptene, cyclooctene, cyclononene, cyclodecene, methylcyclopentene, methylcyclohexene, methylcycloheptene, methylcyclooctene, methylcyclononene, methylcyclodecene, ethylcyclopentene, ethylcyclobutene, ethylcyclooctene, dimethylcyclopentene, dimethylcyclohexene, dimethylcyclopentene, dimethycyclooctene, trimethylcyclodecene and 2-(2-methylbutyl)-1-cyclohexene.

Concrete examples of the copolymerizable unsaturated further monomer other than those of the general formula (3) include cycloolefins, such as, 2,3,3a,7a-tetrahydro-4,7-methano-1H-indene and 3a,5,6,7a-tetrahydro-4,7-methano-1H-indene.

These copolymerizable unsaturated further monomers may be employed solely or in combination, usually in an amount less than 50 mole %, based on the total moles of the monomer units in the molecule of the cycloolefin ring-opening (co)polymer (A-b).

The intrinsic viscosity [η] of the cycloolefin ring-opening (co)polymer (A-b) determined in decalin at 135° C. is 0.01–10 dl/g, preferably 0.05–5 dl/g, and the softening temperature (TMA) in the range from 50° to 200° C., preferably from 60° to 200° C.

For the cycloolefin ring-opening (co)polymer (A-b), those having iodine values of 0–200, preferably 0–60, and crystallinities determined by the X-ray diffraction method of 0–10%, preferably 0–7%, more preferably 0–5% are preferred.

According to the present invention, the cycloolefin ring-opening (co)polymer (A-b) can be employed solely or in combination with the above-mentioned cycloolefin random copolymer (A-d) as a non-crystalline polyolefin resin mixture (in the following, denoted sometimes as "the resin mixture B"), wherein the mixing ratio of these polymers may be the same as that of the resin mixture A.

For producing the ring-opening (co)polymer (A-b) from the cycloolefin monomer represented by the general formula (1), an adequate monomer component selected from those represented by the general formula (1) is subjected to a ring-opening (co)polymerization practiced conventionally to realize the ring-opening (co)polymerization. Here, as the polymerization catalyst, there may be employed a combined catalyst system composed of a halogenide, nitrate or an acetylacetone compound of a metal, such as, ruthenium, rhodium, palladium, osmium, iridium, platinum, molybdenum and wolfram, with a reducing agent, such as, organotin compound or an alcohol; or a combined catalyst system composed of a halogenide or an acetylacetone compound of a metal, such as, titanium, vanadium, zirconium, wolfram and molybdenum with a reducing agent, such as an organoaluminum compound.

The molecular weight of the so-polymerized ring-opening (co)polymer can be adjusted by adding a polymerization regulator, such as an olefin, during the ring-opening (co) polymerization.

For producing the hydrogenation product of the ring-opening (co)polymer, a conventional hydrogenation process can be employed. For the hydrogenation catalyst, in general, those which are used for the hydrogenation of olefin compounds can be employed. Concrete examples of the hydrogenation catalyst include metals, such as, nickel, palladium, platinum and solid catalyst prepared by supporting these metals on an adequate carrier, such as, carbon, silica, diatom earth, alumina and titanium oxide, wherein concrete examples therefor include nickel/silica, nickel/diatom earth, palladium/carbon, palladium/silica, palladium/diatom earth and palladium/alumina, for the heterogeneous catalyst, and those based on the metal of the group VIII of the periodic table, such as, those composed of a compound of Ni or Co with an organometallic compound of a metal of group I-group III of the periodic table, for example, nickel naphthenate/triethylaluminum, cobalt octenate/n-butyllithium and nickel acetylacetonate/triethylaluminum, and rhodium compounds, for the homogeneous catalyst.

The hydrogenation of the ring-opening (co)polimer can be realized in a homogeneous or heterogeneous system in accordance with the each specific catalyst employed under a hydrogen pressure of 1–150 atm and at a temperature of 0°–180° C. preferably 20°–100° C. While the hydrogenation yield can be adjusted by the hydrogen pressure, reaction temperature, reaction duration, catalyst concentration and so on, it is preferable that 50% or more, preferably 80% or more, more preferably 90% or more of the double bonds existing in the main chain of the polymer have been subjected to the hydrogenation, in order to reach superior fastnesses to thermal deterioration and to light-deterioration of the so-obtained hydrogenation product.

The Graft-Modification Product (A-c)

According to the present invention, it is permissible to employ, instead of the cycloolefin random copolymer (A-a), a graft-modification product of the copolymer (A-a) or of the cycloolefin ring-opening (co)polymer (A-b). Examples of the graft-modification product (A-c) include those obtained under the use of a modifying agent, such as, unsaturated carboxylic acids, unsaturated carboxylic acid anhydrides and derivatives of these.

For the unsaturated carboxylic acid to be used to effect the modification, there may be enumerated, for example, acrylic acid, methacrylic acid, α-ethylacrylic acid, maleic acid, fumaric acid, itaconic acid, citraconic acid, tetrahydrophthalic acid, methyl tetrahydrophthalic acid, endosisbicyclo[2.2.1]hept-5-ene-2,5-dicarboxylic acid (Nadic acid: trademark) and methyl-endosis-bicyclo[2.2.1]hept-5-ene-2, 5-dicarboxylic acid (methyl-Nadic acid: trademark). For the unsaturated carboxylic acid anhydride, there may be enumerated, for example, maleic anhydride, citraconic anhydride, Nadic acid anhydride and methyl-Nadic acid anhydride. For the derivatives of unsaturated carboxylic acid, there may be enumerated, for example, acid halides of the above-mentioned unsaturated carboxylic acid (such as maleyl chloride), imides of the above-mentioned unsaturated carboxylic acids (such as maleimide) and esters of the above-mentioned carboxylic acids (such as monomethyl maleate, dimethyl maleate and glycidyl maleate). Among these, maleic anhydride and Nadic acid anhydride are preferred. These modifying agents can be used solely or in combination.

The content of the modifying agent, such as unsaturated carboxylic acid, contained in the graft-modification product (A-c) may be in the range of 0.01–10% by weight, preferably in the range of 0.03–5% by weight. According to the present invention, it is able to use a mixture of the modification product with unmodified polymer, in which it is possible that a modification product of higher modification proportion having a modifying agent content of, for example, over 10% by weight is mixed with the unmodified polymer in a proportion adapted for attaining the abovementioned modifying agent content of the mixture.

As the graft-modified product (A-c), it is preferable to employ those which have an intrinsic viscosity [η] determined in decalin at 135° C. and a softening temperature corresponding to the preferable range as given for the unmodified polymer, with the iodine value, glass transition temperature and the crystallinity being preferably in the same range as those of the above-mentioned unmodified polymer.

For realizing the modification of the cycloolefin random copolymer (A-a) or the cycloolefin ring-opening (co) polymer (A-b) using a modifying agent, for example, a method in which the unmodified polymer is melted and thereto is added the modifying agent, such as unsaturated carboxylic acid, a method in which the unmodified polymer is suspended or dissolved in a solvent and thereto is added the modifying agent, a method in which both the unmodified polymer and the modifying agent are dissolved in a solvent and the reaction is then realized and a method in which the unmodified polymer and the modifying agent are brought into reaction in the state of finely disintegrated solid, such as powder.

During the modification reaction, the modifying agent is grafted to the cycloolefin random copolymer (A-a) or the cycloolefin ring-opening (co)polymer (A-b) to obtain the modification product. There is no special limitation as to the position of the grafting in the polymer molecule by the modifying agent to be grafted to the cycloolefin random copolymer (A-a) or the cycloolefin ring-opening (co) polymer (A-b), but the modifying agent is only required to be combined to a voluntary carbon atom in the polymer (A-a) or (A-b).

In all the above-mentioned methods, it is preferable to effect the graft reaction in the presence of a radical initiator, in order to attain an efficient reaction (graft polymerization) of the modifying agent (the grafting monomer). For the radical initiator, for example, organic peroxides, organic peresters and azo-compounds can be used.

It is preferable to use the radical initiator usually in an amount within the range of 0.001–1 part by weight per 100 parts by weight of the unmodified polymer.

The reaction temperature for the grafting with or without the radical initiator may, in general, preferably in the range of 60°–350° C.

By realizing the modification of the cycloolefin random copolymer (A-a) or the cycloolefin ring-opening (co) polymer (A-b), the ability of the resulting sheet or film to be subjected to heat sealing onto the sealing material, such as aluminum foil, is improved. Since the processibility of the resulting sheet or film product is also increased, it is able to realize a narrower "flange" portions surrounding each blister due to a capability of attaining a more sharp forming at around the blister upon vacuum or pneumatic forming of the blisters for receiving each piece of the articles to be packed therein, so that the number of blisters to be formed on one and the same sheet or film can be increased, due to the attainment of narrower interstitial flange portions.

Among the non-crystalline polyolefin resins (A-a) to (A-c) to be employed according to the present invention, the cycloolefin random copolymer (A-a) and the modification product thereof (A-c) are preferred in view of the transparency and the processibility by vacuum or pneumatic forming, wherein the abovementioned modification product (A-c) is in particular preferable in view of the processibility by vacuum or pneumatic forming and of the ability to subject to heat sealing.

According to the present invention, it is permissible to employ two or more of the above-mentioned non-crystalline polyolefin resin (A-a) to (A-c) (these are denoted hereinafter as essential components) in combination. It is also permitted to incorporate optionally other subsidiary components each in an amount within the range of not obstructing the purpose of the invention, for example, an impact strength-improving rubber, other resins and various additives, such as, heat stabilizer, climate stabilizer, photostabilizer, antistatic agent, slip agent, antiblocking agent, anticlouding agent, nucleating agent, lubricant, dyestuff for absorbing a ray of special wave length, pigment, natural petroleum, synthetic oil, wax and light-permeable filler.

Concrete examples of the optionally incorporated stabilizer include phenolic antioxidants, such as, tetrakis [methylene-3-(3,5-di-t-butyl-4-hydroxyphenyl)propionate]-methane, alkyl esters of β-(3,5-di-t-butyl-4-hydroxyphenyl) -propionic acid and 2,2'-oxamide-bis[ethyl-3(3,5-di-t-butyl-4-hydroxyphenyl) propionate; fatty acid metal salts, such as, zinc stearate, calcium stearate and calcium 12-hydroxystearate; and fatty acid esters of polyols.

These subsidiary components may be incorporated either solely or in combination. Examples of such combination are tetrakis[methylene-3-(3,5-di-t-butyl-4-hydroxyphenyl)- propionate]-methane with zinc stearate and with glycerin monostearate etc.

According to the present invention, preference is placed especially on the employment of a combination of a phenolic antioxidant with a fatty acid ester of polyol. For the fatty acid ester of polyol, there may be employed, for example, a partial ester of polyols in which a part of the alcoholic hydroxyl groups of a trivalent or higher polyhydric alcohol is esterified by fatty acid(s).

Concrete examples of such fatty acid esters of polyols include fatty acid esters of glycerin, such as, glycerin monostearate, glycerin monolaurate, glycerin monomyristate, glycerin monopalmitate, glycerin distearate and glycerin dilaurate; fatty acid esters of pentaerithritol, such as, pentaerithritol monostearate, pentaerithritol monolaurate, pentaerithritol distearate and pentaerithritol tristearate. These fatty acid esters may be employed either solely or in combination with each other.

The phenolic antioxidant may preferably be employed in an amount of less than 10 parts by weight, preferably less than 5 parts by weight, more preferably less than 2 parts by weight per 100 parts by weight of the total sum of the essential components according to the present invention.

The fatty acid ester of polyol may preferably be used in an amount of less than 10 parts by weight, preferably less than 5 parts by weight, per 100 parts by weight of the total sum of the essential components according to the present invention.

Crystalline Polyolefin Resin (B)

Now, the description is directed to the crystalline polyolefin resin (B) to be employed as a material for the other sheet or film to be laminated on the sheet or film of the non-crystalline polyolefin resin (A).

The crystalline polyolefin resin (B) to be employed according to the present invention has usually a degree of crystallinity of 10% or higher, preferably 15% or higher, determined by the X-ray diffraction method.

For the crystalline polyolefin resin (B), there may be employed homopolymers of α-olefins having 2–12 carbon atoms, copolymers of one of such α-olefins with an amount, for example, less than 10 mole %, preferably less than 6 mole %, of other α-olefin(s) and mixtures of these crystalline polyolefins. Preferable examples include crystalline polypropylene resins and mixtures of polypropylene resins (B-e) composed of such crystalline polypropylene resin with polyethylene resins having a density of at least 0.930 g/cm$^3$.

Since these crystalline polyolefin resins themselves have lower compatibility with the above-mentioned non-crystalline polyolefin resin (A) and are not adapted for use for the production of laminated sheet or film by co-extrusion method, it is necessary to produce such laminated sheet or film by means of dry lamination of a sheet or film of the non-crystalline polyolefin resin (A) with a sheet or film of the crystalline polyolefin resin (B) using an adhesive. In contrast thereto, a mixture of polyolefins of different crystallinity, especially the above-mentioned crystalline polypropylene resin mixture (B-e) composed of the crystalline polypropylene resin with the polyethylene resin having a density of at least 0.930 g/cm$^3$ exhibits an improved compatibility with the non-crystalline polyolefin resin (A) and can be processed by co-extrusion to obtain a laminate.

For the crystalline polypropylene resin to be incorporated as one component of the above-mentioned crystalline polypropylene resin mixture (B-e), it is preferable to employ a homopolymer of propylene or a copolymer of propylene with other α-olefin with a propylene content of 90 mole % or higher, preferably 94 mole % or higher, having a melt flow rate at 230° C. of 0.05–100 g/10 min., preferably 0.5–50 g/10 min., a density of 0.89–0.93 g/cm$^3$, preferably 0.90–0.92 g/cm$^3$, and a thermal deformation temperature under a load of 4.6 Kg/cm$^2$ of 90°–140° C., preferably 100°–130° C.

As the other α-olefin to be copolymerized with propylene, there may be enumerated, for example, ethylene and others which have 4–14 carbon atoms, preferably 4–10 carbon atoms, such as, ethylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene.

As the polyethylene resin to be incorporated as the other component of the crystalline polypropylene resin mixture (B-e), there may be employed homopolymers of ethylene or copolymers of ethylene with other α-olefin with an ethylene content of 90 mole % or higher, preferably 95 mole % or higher, having a density of 0.930 g/cm$^3$ or higher, preferably 0.940–0.980 g/cm$^3$. It is preferable for such polyethylene resin to exhibit a melt flow rate at 190° C. of 0.01–100 g/10 min., preferably 0.03–50 g/10 min. and a Vicat softening point of 110°–140° C., preferably 115°–130° C.

Examples of the other α-olefin to be copolymerized with ethylene include those which have 3–14 carbon atoms, preferably 3–10 carbon atoms, such as, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene.

The mixing proportion of the crystalline polypropylene resin and the polyethylene resin may desirably be 90–40/10–60, preferably 85–50/15–50, in the weight ratio of polypropylene resin/polyethylene resin.

The crystalline polypropylene resin mixture (B-e) may contain, in addition to the crystalline polypropylene resin and the polyethylene resin, other additives in an amount not obstructing the purpose of the invention, for example, an impact strength improving rubber, other resins and various additives, such as, heat stabilizer, climate stabilizer, photostabilizer, antistatic agent, slip agent, antiblocking agent, anticlouding agent, nucleating agent, lubricant, dyestuff for absorbing a ray of special wave length, pigment, natural petroleum, synthetic oil, wax and light-permeable filler.

The crystalline polypropylene resin mixture (B-e) can be produced by a known method, for example, in a manner of mixing the resin components on, for example, Henschel mixer, V-blender, ribbon blender or tumbler blender; or in a manner of mixing the resin components followed by melt-kneading the mixture on, for example, a monoaxial extruder, biaxial extruder or kneader and, then, granulating or crushing the resulting mass.

The sheet or film according to the present invention is prepared by (1) processing the non-crystalline polyolefin resin (A) or a blend of this with other optionally added subsidiary components into a sheet or film, or by (2) laminating the sheet or film produced in this manner with another sheet or film made of the crystalline polyolefin resin (B) or mixture of this resin (B) with optionally incorporated further components. Such lamination can be effected voluntarily, for example, in a lamination sequence of crystalline resin (B) layer/non-crystalline resin (A) layer/crystalline resin (B) layer; non-crystalline resin (A) layer/crystalline resin (B) layer/non-crystalline resin (A) layer; or crystalline resin (B) layer/non-crystalline resin (A) layer. Among these, the sequence in which the non-crystalline resin layer is sandwiched between two layers of crystalline resin layer, namely, crystalline resin (B) layer/non-crystalline resin (A) layer/crystalline resin (B) layer, is preferred.

While the non-crystalline polyolefin resin (A) is excellent in the transparency, moistureproof property, processibility by vacuum or pneumatic forming and dead hold property, it suffers from the phenomenon of sudden softening at around the glass transition temperature, resulting in a decrease of elastic modulus and strength due to its non-crystalline nature. Therefore, a single layer sheet or film made of only the non-crystalline polyolefin resin (A) exhibits a somewhat narrower flexibility in the condition of processing by inflation molding or vacuum or pneumatic forming and is also inferior in the heat sealing ability. However, such disadvantage can be remedied by, as described above, laminating the sheet or film of the non-crystalline resin (A) with a further sheet or film made of the crystalline polyolefin resin (B). Moreover, the processibility and the heat sealing ability can be improved by incorporating a graft-modification of the non-crystalline polyolefin resin (A) as in one aspect of the present invention. The improvement of the processibility by the graft-modification is higher when the sheet or film of the non-crystalline polyolefin resin (A) is laminated with the sheet or film of the crystalline polyolefin resin (B), while the improvement in the heat sealing ability is higher for the sole employment of the sheet or film of the graft-modified product (A-c).

For processing the sheet or film of the polymer material into a formed (blistered) product for packaging, it is necessary to attain the forming by softening the polymer material of the sheet or film at a temperature above the softening temperature thereof. The processibility of the sheet or film by vacuum or pneumatic forming is improved for the laminated sheet or film, as compared with the monolayer sheet or film, since, for example, the externally placed sheet or film of the crystalline polyolefin resin (B) persists against yielding to the forming action due to its still retained stiff consistency even at a temperature at which the interposed layer of non-crystalline resin (A) has been softened. For this reason, the edge portions of each blister on the resulting profiled material are shaped very sharply, so that the interstitial flange portions between the blisters can be designed more narrowly, whereby the number of blisters on one and the same sheet or film can be increased.

While there is no special limitation as to the thickness of the sheet or film according to the present invention, a thickness of 150–5,000 μm, especially 200–1,000 μm is preferable, since a sufficient moistureproof property can be attained with such a thickness, even for a PTP or a blister package for packaging a drug necessitating a high moistureproof property.

The monolayer sheet or film can be produced by an ordinary method for producing monolayer sheet or film, for example, by using a T-die or by inflation molding. The laminated sheet or film can be prepared by a conventional method for preparing a multilayer sheet or film, for example, by dry-lamination and by a co-extrusion molding, such as, molding using a multilayer T-die and multilayer inflation molding. The resulting sheet or film is used as such, without subjecting it to stretching step, i.e., a non-stretched film is used for producing a blistered formed product for PTP or blister package. If the monolayer or multilayer sheet or film has been subjected to a monoaxial or a biaxial stretching, the processibility of the resulting sheet or film by vacuum or pneumatic forming becomes deteriorated and, thus, the productivity will be decreased due to the lower forming velocity and increased rate of occurrence of rejects, so that the sheet or film is employed according to the present invention without subjecting it to stretching step. Stretched sheet or film exhibits further disadvantage of occurrence of shrinkage upon vacuum forming due to the elevation of the surface temperature above the softening temperature thereof and, also for this reason, it does not adapt to processing by vacuum forming.

A further measure for attaining improvement in the processibility and adaptability of the sheet or film is provided by coating the sheet or film with a layer of vinylidene chloride or other resins.

In practicing the lamination of the sheet or film of non-crystalline polyolefin resin (A) with a sheet or film having lower compatibility therewith, such as the crystalline polyolefin resin (B), application of co-extrusion is difficult, so that they should be laminated by a dry lamination using an adhesive. However, in practicing the lamination of the sheet or film of the non-crystalline polyolefin resin (A) with the sheet or film of the crystalline polypropylene resin mixture (B-e), the co-extrusion can be applied.

The sheet or film according to the present invention is excellent in the moistureproof property and transparency and is also superior in the processibility by vacuum or pnuematic forming, so that it can be used for the material for PTP or blister package with satisfactory performance. The sheet or film according to the present invention is processed by vacuum or pneumatic forming to form blisters each having a configuration adapted to fit to the contour of each piece of the articles to be packed as a PTP or blister package. For processing the sheet or film by vacuum or pnuematic forming, the same conditions as in a conventional processing may be employed and, thus, a surface temperature of the sheet or film of 30°–300° C. preferably 50°–150° C., and a forming pressure of 0.2–20 kg/cm² G, preferably 0.2–10 kg/cm² G may be employed.

The PTP or blister package according to the present invention comprise the above-mentioned formed product having formed thereon blisters by vacuum or pneumatic forming made from the sheet or film according to the present invention and of a sealing element to be employed in association therewith. The formed product has blisters formed thereon with a contour adapted to fit to each piece of the articles to be packed therein with the portion surrounding each blister constituting a flange for serve for sealing the package by bonding the flange to the sealing element by heat sealing or by using an adhesive.

The actual procedure of packaging the articles to be packaged by PTP or blister package according to the present invention comprises placing the articles to be packaged in the blister cavities of the formed product, covering the resulting formed product having the articles received in the blister cavities with a flat sealing element and effecting the sealing of the package by heat sealing or by gluing with an adhesive the flange portions surrounding each blister onto the sealing element.

For the sealing element, usually a supporting paper is employed for a general blister package, while other pertinent material may also be used. While in the case of PTP, aluminum foil is employed usually, it is possible also to use an aluminum foil which has been coated with a thin layer of the non-crystalline polyolefin resin (A) according to the present invention in order to improve the moistureproof property and the heat sealing ability. It is also possible to use a sheet or film of a non-crystalline polyolefin resin according to the present invention as the element, instead of using an aluminum foil.

In some cases, a difficulty may occur upon heat sealing of the formed product together with the sealing element due to the insufficient heat sealing ability of the non-crystalline polyolefin resins (A-a) and (A-b) according to the present invention. On the other hand, the heat sealing can be realized easily for the sheet or film of the graft-modification product (A-c), since it exhibits improved heat sealing ability as mentioned above. Therefore, the heat sealing of the sheet or film onto the sealing element can be rendered easy when at least either one of the formed product and the sealing element is made of the graft-modified product (A-c).

If the graft-modified product (A-c) is not employed for both the formed product and the sealing element, for example, when the formed product is made of the non-crystalline polyolefin resin (A-a) or (A-b) and the sealing element is a supporting paper or an aluminum foil, the sealed package can be attained by gluing the both using an adhesive. In such a case also, application of heat sealing can easily be realized, when a layer of the graft-modified product (A-c) or other heat sealable resins is coated on the supporting paper or on the aluminum foil.

Due to the excellent moistureproof property and transparency of the sheet or film according to the present invention, the PTP or blister package prepared therefrom can serve for increasing the commercial value of the articles packed therewith.

By the PTP or blister package according to the present invention, voluntary articles, such as, drugs, food products, household commodities and miscellaneous goods, in particular, pelletized and encapsulated drugs, food products such as rice cakes, snacks and cookies, moisture-absorbing articles such as cigarettes, tea bags etc., can be packaged with better preservation of the moistureproof property and transparency.

As described above, the sheet or film made from the material with essential components according to the present invention can afford to provide a PTP or blister package exhibiting an excellent moistureproof property and transparency together with a superior processibility by vacuum or pneumatic forming, due to the employment of the special non-crystalline polyolefin resin (A).

In addition, by laminating the sheet or film of such non-crystalline polyolefin resin (A) with another sheet or film made of the crystalline polyolefin resin (B), the flexibility in selecting the condition for the processing by vacuum or pneumatic forming or inflation molding and the condition for effecting the heat sealing is increased with simultaneous attainment of increase in the number of blisters to be formed on one and the same sheet or film.

The PTP or blister package according to the present invention is excellent in the moistureproof property and in the transparency due to the employment of such sheet or film mentioned above.

By the method of packaging various articles with the PTP or blister package of the present invention, the articles can be packed with the blistered sheet or film according to the present invention to form a package excellent in the moistureproof property and in the transparency.

PREFERRED EMBODIMENTS OF THE INVENTION

Below, the present invention will be described by way of Examples with reference to the appended Drawings.

In FIGS. 1–4, various modes of packaging articles using the formed product according to the present invention each in a sectional view. In the Figures, the numeral 1 represents the package according to the present invention composed of a formed product 2 and a sealing element 3, with which articles 4 are packaged.

In the package 1 of FIG. 1, the formed product 2 is made of the cycloolefin random copolymer (A) and in which a plurality of blisters 5 each having a size and contour adapted to receive each piece of the articles 4 to be packed and corresponding flange portions 6 surrounding each blister 5 are formed.

The sealing element 3 constituted of an aluminum foil 7 having thereon a coated layer 8 of heat sealable resin consisting mainly of the graft-modified product (A-c) and is arranged with its heat sealable layer 8 facing to the formed product 2 to couple to the formed product 2.

In the package 1, the articles 4 are held accommodated in each blister cavity with the flange portions 6 of the formed product 2 and the corresponding portions of the heat sealable layer 8 on the sealing element being bonded together in tight seal by heat sealing.

Such package 1 is prepared by placing each piece of the articles 4 in the cavity of the blister 5 of the formed product 2, covering thereon with the sealing element 3 and bonding the flange portions 6 with the corresponding portions of the heat sealable resin layer 8 by heat sealing.

Figure 2:
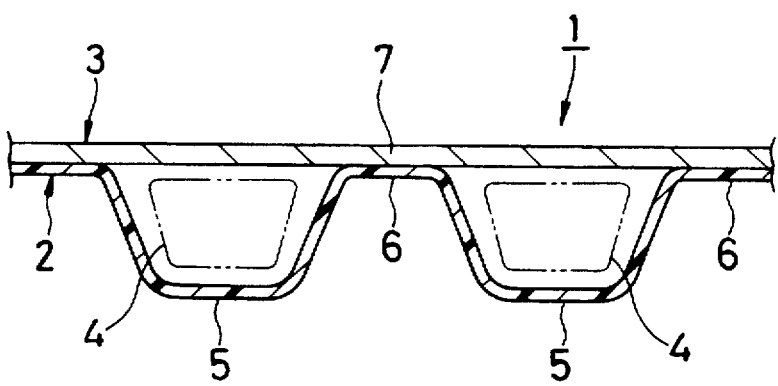

The package 1 of FIG. 2 is composed of a formed product 2 made of the graft-modified product(A-c) and a sealing element 3 consisting of an aluminum foil 7. In this package 1, the formed product 2 has in itself a heat sealable nature and, therefore, the flange portions 6 are bonded directly to the aluminum foil 7 by heat sealing.

Figure 3:
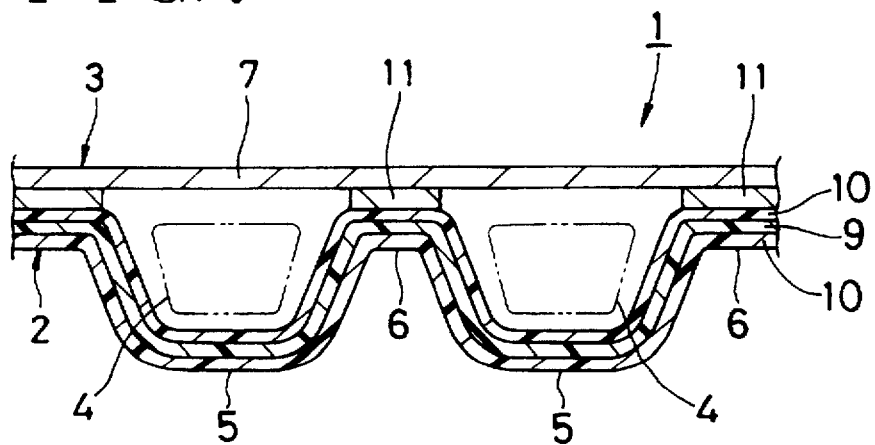

The package 1 of FIG. 3 is composed of a formed product 2 prepared from a laminated sheet and of a sealing element 3 consisting of an aluminum foil 7. The formed product 2 is prepared from a laminate of a layer 9 of the non-crystalline polyolefin resin (A) sandwiched between two externally disposed layers 10 of crystalline polyolefin resin (B). In this package 1, the formed product 2 and the aluminum foil 7 are bonded together using an adhesive 11.

Figure 4:
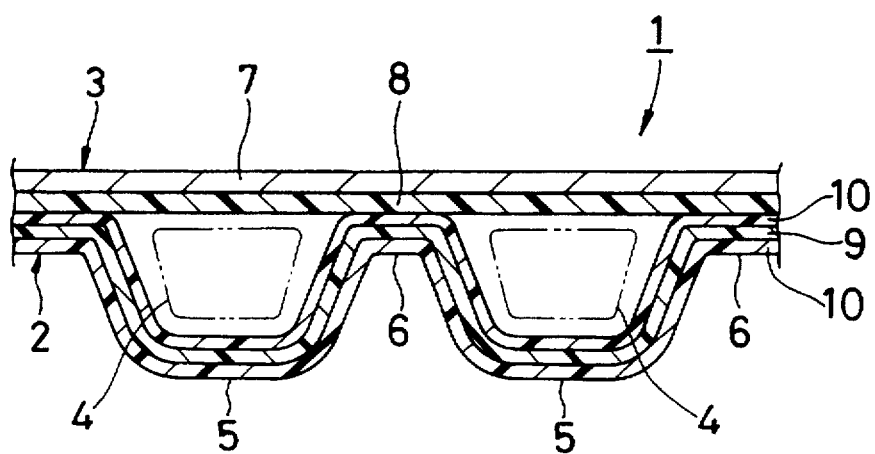

The package 1 of FIG. 4 is constituted of a formed product 2 which is prepared from a laminate composed of a layer 9 of the non-crystalline polyolefin resin sandwiched between two externally disposed layers 10 of the crystalline polyolefin resin, on the one hand, and a sealing element 3 which is made of an aluminum foil 7 having coated thereon a layer 8 of a heat sealable resin, on the other hand, bonded together by heat sealing.

EXAMPLE 1

A copolymer of ethylene and 8-ethyltetracyclo [$4.4.0.1^{2,5}.1^{7,10}$]-3-dodecene [a cycloolefin monomer of a molecular structure represented by the general formula (1) in which n=0, m=1, q=0, $R^7$–$R^{14}$ and $R^{16}$–$R^{18}$ each stand for hydrogen atom and $R^{15}$ is ethyl; which is abbreviated in the following as ETCD-3] having an intrinsic viscosity [η] of 0.68 dl/g, a softening temperature (TMA) of 88° C. and Tg of 70° C. was used as the starting material. This starting material was processed into a sheet having a thickness of 0.25 mm by means of T-die molding using an extruder of 30 mmφ. The physical properties including the moistureproof property and transparency were determined for the so-obtained sheet. Results are summarized in Table 1.

EXAMPLE 2

A copolymer of ethylene and ETCD-3 having an intrinsic viscosity [η] of 0.77 dl/g, a softening temperature (TMA) of 60° C. and Tg of 45° C. was used as the starting material. This starting material was processed into a sheet having a thickness of 0.25 mm by means of T-die molding using an extruder of 30 mmφ. The physical properties including the moistureproof property and transparency were determined for the so-obtained sheet in the same manner as in Example 1. Results are summarized also in Table 1.

Comparative Example 1

A polypropylene having an intrinsic viscosity [η] of 3.0 dl/g was employed as the starting material. This starting material was processed into a sheet having a thickness of 0.25 mm by using the same apparatus as that employed in Example 1. The physical properties including the moistureproof property and transparency were determined for the so-obtained sheet in the same manner as in Example 1. Results are summarized also in Table 1.

EXAMPLE 3

To 100 parts by weight of a pelletized product of the copolymer of ethylene/ETCD-3 employed in Example 1, 1 part by weight (calculated as maleic acid) of maleic anhydride in a form of an acetone solution and 0.2 part by weight of a peroxy compound [Perhexin 25B (trademark) of Nippon Oil and Fats Co.] were admixed homogeneously and the resulting mixture was processed on a biaxial extruder at a cylinder temperature of 230° C. to effect a modification by maleic anhydride grafting.

95 parts by weight of the unmodified copolymer of ethylene/ETCD-3 and 5 parts by weight of the graft-modified pelletized product of the ethylene/ETCD-3 copolymer obtained as above (with a grafted amount of maleic anhydride of 0.7% by weight) were mixed together and the resulting mixture was processed in the same manner as in Example 1 to prepare a sheet having a thickness of 0.25 mm. The physical properties of the resulting sheet were determined in the same manner as in Example 1. Also, the heat sealing ability of this sheet associated with an aluminum foil was examined. The heat sealing ability was assessed by the heat seal strength under the following test conditions. Results are summarized in Table 1 below.

Test Condition for Heat Seal Strength

Aluminum foil: 100 μm thickness, with no surface treatment
Heat sealing: hot plate temperature of 240° C., with pressing time of 0.5 sec.
Bonding strength: a heat sealed laminate of ethylene-ETCD-3 sheet/aluminum foil was cut to form elongated ribbons of 20 mm width and T-peeling test was carried out by peeling the laminate from one end of the ribbon at a peeling velocity of 50 mm/min. to determine peel strength.

EXAMPLE 4

Laminated sheets were produced, for which the physical properties were determined.

For the non-crystalline polyolefin resin (A), the copolymer of ethylene/ETCD-3 employed in Example 1 was used. For the crystalline polyolefin resin (B), a crystalline polypropylene resin mixture (B-e) was employed, which was obtained by melt-blending a polypropylene product having a melt flow rate at 230° C. (determined according to ASTM D 1238) of 7.2 g/10 min., a density (determined according to ASTM D 1505) of 0.91 g/cm³, a degree of crystallinity determined by X-ray diffraction method of 58% and a thermal deformation temperature under a load of 4.6 kg/cm² (determined according to ASTM D 648) of 112° C. with a polyethylene product having a melt flow rate at 190° C. of 5.5 g/10 min., a density of 0.968 g/cm³ and a Vicat softening point (determined according to ASTM D 1525) of 125° C. at a weight mixing proportion of polypropylene/polyethylene of 6/4 on an extruder.

From the above starting materials, an extrusion laminated sheet of binary resin triple layers with lamination sequence of [layer of crystalline resin mixture (B)]/[layer of ethylene-ETCD-3 copolymer (A)]/[layer of crystalline polypropylene resin mixture (B-e)] was produced by a T-die co-extrusion. The thickness of each layer was settled to be 200 μm for the (A) layer and 50 μm for both the (B) layers.

Condition of Molding

Molding apparatus: binary resin triple layer extruder
Screws: gradual compression full flight type of 40 mm diameter, with L/D=24, for non-crystalline polyolefin resin (A); and gradual compression full flight type of 30 mm diameter, with L/D=24, for crystalline polypropylene resin mixture (B)
Cylinder temp.: 200° C. for non-crystalline resin (A) and 200° C. for crystalline polypropylene resin mixture (B)
Die: T-die, multimanifold type The physical properties of the resulting laminated sheet were determined in the same manner as in Example 1. The heat sealing ability was also assessed for this laminated sheet in association with the sealing element in the same manner as in Example 3. For the sealing element, an aluminum foil having a thickness of 100 μm and coated with a layer of maleic anhydride-modified polypropylene (with maleic anhydride content of 0.4% by weight) was employed. Results are summarized also in Table 1.

TABLE 1

| Parameter | Example 1 | Example 2 | Comp. Ex. 1 | Example 3 | Example 4 |
|---|---|---|---|---|---|
| [η] of Ethylene/ETCD-3 (dl/g) | 0.68 | 0.77 | 3.0 | 0.68 | 0.68 |
| Tg of Ethylene/ETCD-3 (°C.) | 70 | 45 | — | 70 | 70 |
| Sheet thickness (mm) | 0.25 | 0.25 | 0.25 | 0.25 | 0.25 |
| Haze (%) | 1.3 | 1.5 | 34.7 | 3.2 | 15 |
| Light permeability (%) | 92 | 92 | 91 | 92 | 92 |
| Moisture permeability at 40° C., 90% r.h. (g/m² · 24 hr) | 0.35 | 0.36 | 1.12 | 0.36 | 0.48 |
| Forming Test[1] | #3[2] | #3[2] | #2[2] | #3[2] | #3[2] |
| Heat seal strength (g/20 mm) | — | — | — | 1530 | 2010 |

Note:
[1]By vacuum forming of blisters each having a diameter of 13 mm and a depth of 6 mm; visual evaluation by the following scheme 2):
[2]#3: Bottom edge portions are sharp and very good forming is attained.
2: Bottom edge portions are somewhat rounded and good forming is attained.
1: Forming of bottom edge is impossible.

From Table 1, it is seen that all the sheet products of Examples are superior in the processibility by vacuum forming, moistureproof property and transparency as compared with those of Comparative Example. The sheet products of Examples exhibit higher heat seal strength.

EXAMPLE 5

An extrusion laminated sheet of binary triple layers was produced by T-die co-extrusion in the same manner as in Example 4 except that a copolymer of ethylene/ETCD-3 having an intrinsic viscosity [η] of 0.67 dl/g and a softening temperature (TMA) of 90° C. was employed instead of the copolymer of Example 4.

The physical properties, processibility by forming and interlayer bonding strength between the layer of the crystalline polypropylene resin mixture (B-e) and the layer of the non-crystalline copolymer of ethylene/ETCD-3 (A) were assessed by the procedures given below. Results are summarized in Table 2.

Procedures for Assessments

1) Thickness of each layer:
   Determined by cutting the laminated sheet vertical to the sheet face and examining the section using a microscope.
2) Light permeability:
   Determined according to ASTM D 1003
3) Moisture permeation coefficient:
   Determined according to ASTM F 1249 at 40° C. and a relative humidity of 90%.
4) Interlayer Bonding Quality:
   Assessed by crumpling the laminated sheet at its edge to examine occurrence of separation of the laminate, in which the sample showing laminate separation is judged as unqualified
5) Continuous Processibility by Vacuum/Pneumatic Forming:
   Examined by cutting the laminated sheet into ribbons having a width of 10 mm and a length of 150 mm, maintaining the resulting ribbons at a gas atmosphere temperature of 80° C. for 1 minute and effecting a tensile test at a force of 1 Kg/cm², wherein the ribbon exhibited an elongation not exceeding 1% is judged as qualified.

EXAMPLE 6

The procedures of Example 5 were repeated except that a polypropylene having a melt flow rate at 230° C. of 11.5 g/10 min., a density of 0.91 g/cm³, a degree of crystallinity determined by X-ray diffraction method of 59% and a thermal deformation temperature under a load of 4.6 Kg/cm² of 110° C. and a polyethylene having a melt flow rate at 190° C. of 6.1 g/10 min., a density of 0.957 g/cm³ and a Vicat softening point of 115° C. were employed at a polypropylene/polyethylene weight ratio of 6/4, in the place of the crystalline polypropylene resin mixture (B-e) of Example 5. Results are summarized also in Table 2.

TABLE 2

| Parameter | Example 5 | Example 6 |
| --- | --- | --- |
| Thickness of each layer for layers B/A/B (μm) | 30/200/30 | 30/200/30 |
| Light permeability (%) | 91 | 91 |
| Moist. permeab. coef. (g/m² · 24 hr) | 0.35 | 0.35 |
| Interlayer bonding quality | Qualified | Qualified |
| Continuous processibility | Qualified | Qualified |

From table 2, it is seen that laminated sheet products of Example 5 and 6 exhibit better physical properties, showing that the interlayer bonding quality can be improved by the co-extrusion lamination without deteriorating the light permeability, moisture permeability coefficient and continuous processibility.

We claim:

1. Press through packaging or blister package, comprising a formed product having blisters thereon prepared by forming a sheet or film of a non-stretched and moisture proof layer made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer,

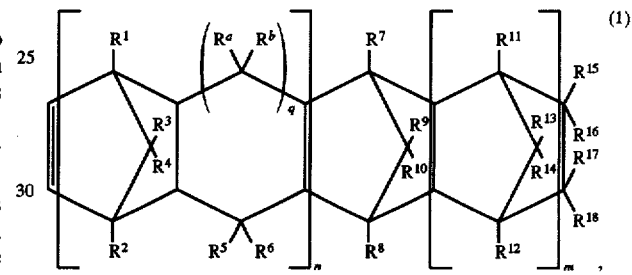

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

2. Press through packaging or blister package as claimed in claim 1, wherein in the formula (1) n=1.

3. Press through packaging or blister package, comprising a formed product having blisters thereon prepared by forming a sheet or film of a non-stretched and moisture proof layer made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer, and a non-stretched layer laminated therewith and made of one or more crystalline polyolefin resin (B),

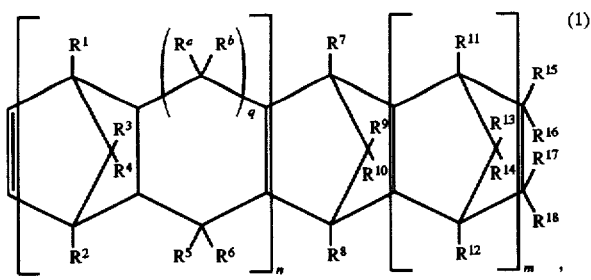

(1)

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

4. Press through packaging or blister package as claimed in claim 3, wherein a laminate is formed in a sandwich structure in the lamination sequence of layer of crystalline polyolefin resin (B)/layer of non-crystalline polyolefin resin (A)/layer of crystalline polyolefin resin (B).

5. Press through packaging or blister package as claimed in claim 3 or 4, wherein the crystalline polyolefin resin (B) is a crystalline polypropylene resin.

6. Press through packaging or blister package as claimed in claim 5, wherein a laminate is formed by dry lamination by gluing the layer of non-crystalline polyolefin resin (A) and a layer of crystalline polypropylene resin (B) together with an adhesive.

7. Press through packaging or blister package as claimed in claim 3 or 4, wherein the crystalline polyolefin resin (B) comprises a resin mixture composed of a crystalline polypropylene resin and a polyethylene resin having a density of at least 0.930 g/cm³.

8. Press through packaging or blister package as claims in claim 7, wherein the lamination is effected by co-extruding a sheet or film of the non-crystalline polyolefin resin (A) with a sheet or film of the crystalline polypropylene resin mixture.

9. Press through packaging or blister package, consisting essentially of (I) a formed product having blisters thereon prepared by forming a sheet or film of a single non-stretched and moisture proof layer made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer, and (II) a sealing element for sealing the formed product having received in the cavities of the blisters the articles to be packaged,

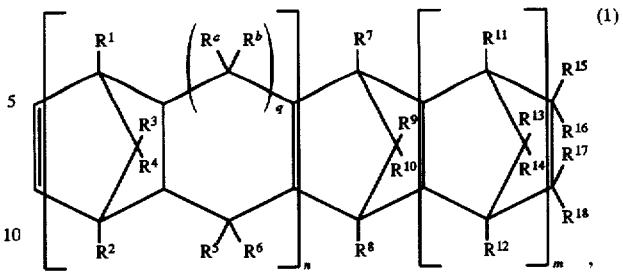

(1)

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene radical by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

10. Press through packaging or blister package, comprising (I) a formed product having blisters thereon prepared by forming a laminated sheet or film composed of at least one non-stretched and moisture proof layer made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer, and laminated therewith, at least one non-stretched layer made of a crystalline polyolefin resin (B) and (II) a sealing element for sealing the formed product having received in the cavities of the blisters the articles to be packaged,

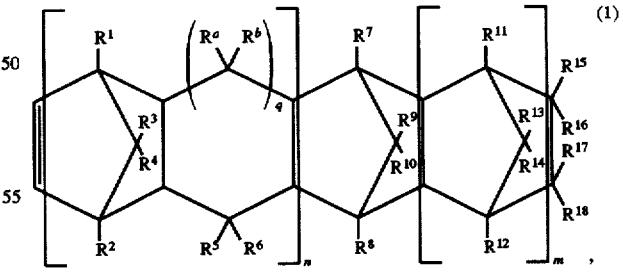

(1)

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene radical by a chemical combination of $R^{15}$ with $R^{16}$ or $R^{17}$ with $R^{18}$ and wherein the monocyclic or polycyclic ring formed from R¹⁵–R¹⁸ may have one or more double bonds and, in the case of q=0, a five-membered ring is formed there by combining each of the chemical bonds.

11. Press through packaging or blister package as claimed in claim 9 or 10, wherein the formed product has blisters for receiving each piece of the articles to be packed and flange portions surrounding each of the blisters, said flange portions being bonded with the sealing element to provide tight sealing of the package.

12. Press through packaging or blister package as claimed in claim 11, wherein a sealing element having coated thereon with a layer of the graft-modified product of said cyclooefin random copolymer is bonded to the flange portions of the blistered formed product by heat sealing.

13. Press through packaging or blister package as claimed in claim 9 or 10, wherein the sealing element is made of an aluminum foil.

14. Press through packaging or blister package as claimed in claim 9 or 10, wherein the sealing element is made by laminating an aluminum foil or a supporting paper with a layer of a graft-modified product of an ethylene/cycloolefin random copolymer resulting from the copolymerization of ethylene and a cycloolefin monomer represented by the general formula (1), which has an intrinsic viscosity (η) determined at 135° C. in decalin of 0.01–10 dl/g and a softening temperature (TMA) of 50–200.

15. Press through packaging or blister package as claimed in claim 9, wherein the sealing element comprises said single layer sheet or film.

16. Press through packaging or blister package as claimed in claim 10, wherein the sealing element comprises said laminated sheet or film.

17. A method for packaging articles to be packaged, by press through packaging or blister package, comprising placing each piece of articles to be packed in each cavity of blisters of a formed product having blisters and flange portions surrounding each of the blisters and prepared by forming a sheet or film of a single non-stretched and moisture proof layer which is made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer, covering the formed product, which has now the articles accommodated in the blister cavities, with a sealing element and bonding the flange portions of the formed product to the corresponding portion of the sealing element by heat sealing or by means of an adhesive to effect tight sealing of the package,

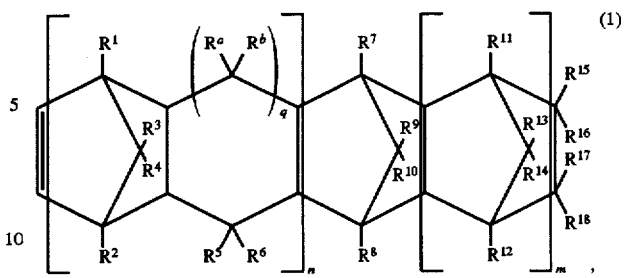

in which n is zero or 1, m is zero or any positive integer, q is zero or 1, R¹–R¹⁸ as well as Rᵃ and Rᵇ represent each independently with each other an atom or a radical selected from the group consisting of hydrogen atom, halogen atoms and hydrocarbon groups, wherein R¹⁵–R¹⁸ may form a monocyclic ring or a polycyclic ring by combining with each other or may form an alkylidene radical by a chemical combination of R¹⁵ with R¹⁶ or R¹⁷ with R¹⁸ and wherein the monocyclic or polycyclic ring formed from R¹⁵–R¹⁸ may have one or more double bonds and, in the case of q=0, a five-membered ring is formed there by combining each of the chemical bonds.

18. A method for packaging articles to be packaged, by press through packaging or blister package, comprising placing each piece of articles to be packed in each cavity of blisters of a formed product having blisters and flange portions surrounding each of the blisters and prepared by forming a laminated sheet or film which is composed of at least one non-stretched and moisture proof layer which is made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer, and laminated therewith, at least one non-stretched layer made of a crystalline polyolefin resin (B), covering the formed product, which has now the articles accommodated in the blister cavities, with a sealing element and bonding the flange portions of the formed product to the corresponding portion of the sealing element by heat sealing or by means of an adhesive to effect tight sealing of the package,

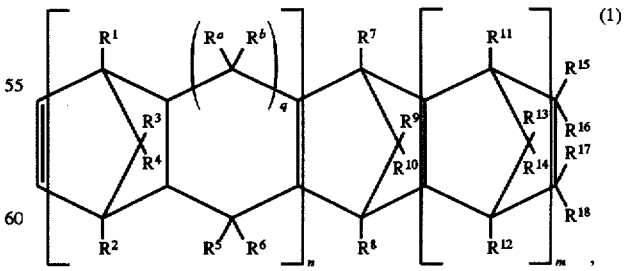

in which n is zero or 1, m is zero or any positive integer, q is zero or 1, R¹–R¹⁸ as well as Rᵃ and Rᵇ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene radical by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

19. Press through packaging or blister package, comprising a formed product having blisters thereon prepared by forming a sheet or film of a non-stretched and moisture proof layer made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer, and a non-stretched layer laminated therewith and made of one or more crystalline polyolefin resin (B) selected from the group consisting of crystalline polypropylene and a mixture composed of crystalline polypropylene and polyethylene,

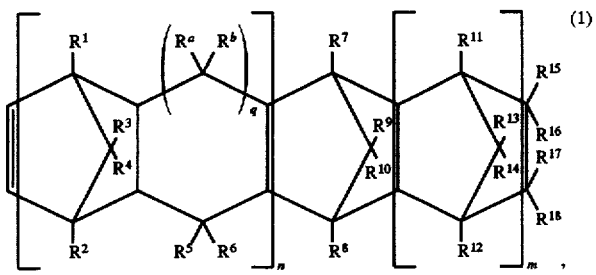

(1)

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene radical by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

20. Press through packaging or blister package as claimed in claim 19, wherein in formula (1) q is zero.

21. A press through packaging or blister package sheet or film, comprising a formed product having blisters thereon prepared by forming a sheet or film of a non-stretched and moisture proof layer made of one or more non-crystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.05–5 dl/g determined in decalin at 135° C. and a softening temperature (TMA) of 60°–200° C., and a graft-modified product of said cycloolefin random copolymer,

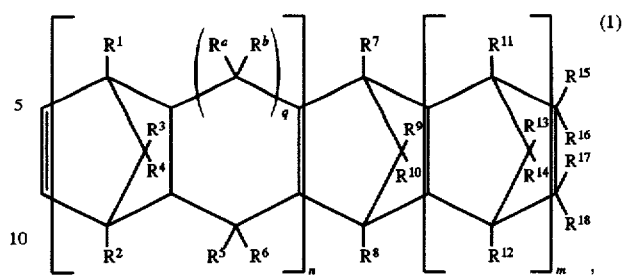

(1)

in which n is zero or 1, m is zero or any positive integer, q is zero or 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by combining each of the chemical bonds.

22. A moisture proof sheet or film according to claim 21, wherein in the formula (1) n=1.

23. A moistureproof press through packaging or blister package sheet or film of claim 21 wherein n=1 and q=1.

24. Press through packaging or blister package, comprising a formed product having blisters thereon prepared by forming a sheet or film of a non-stretched and moisture proof sheet or film made of one or more noncrystalline polyolefin resins (A) selected from the group consisting of a cycloolefin random copolymer which is obtained from a non-ring-opening polymerization of ethylene and a cycloolefin having a molecular structure represented by the general formula (1) given below, with an intrinsic viscosity (η) of 0.01–10 dl/g determined in decalin at 135° C. and a softening temperature (TMA) of 50°–200° C., and a graft-modified product of said cycloolefin random copolymer,

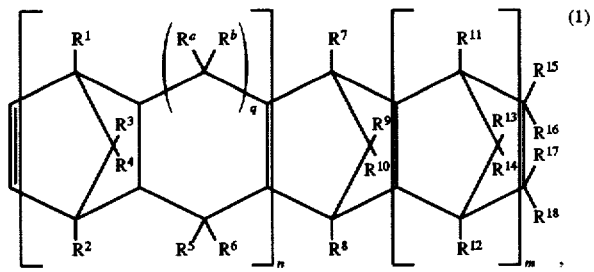

(1)

in which n is 1, m is zero or any positive integer, q is 1, $R^1$–$R^{18}$ as well as $R^a$ and $R^b$ represent each independently with each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds.

25. Press through packaging or blister package of claim 1, 3, 9, 9 or 19, wherein n=1 and q=1.

* * * * *